United States Patent
Takatsuka et al.

(10) Patent No.: US 12,273,633 B2
(45) Date of Patent: Apr. 8, 2025

(54) IMAGE PROCESSING METHOD AND SENSOR DEVICE FOR PERFORMING COLORING PROCESSING ON AN IMAGE SIGNAL ACQUIRED USING AN ARRAY SENSOR

(71) Applicant: Sony Group Corporation, Tokyo (JP)

(72) Inventors: Susumu Takatsuka, Tokyo (JP); Hiroki Tetsukawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 256 days.

(21) Appl. No.: 17/793,034

(22) PCT Filed: Dec. 25, 2020

(86) PCT No.: PCT/JP2020/048890
§ 371 (c)(1),
(2) Date: Jul. 15, 2022

(87) PCT Pub. No.: WO2021/166450
PCT Pub. Date: Aug. 26, 2021

(65) Prior Publication Data
US 2023/0037953 A1    Feb. 9, 2023

(30) Foreign Application Priority Data
Feb. 19, 2020  (JP) ................. 2020-025952

(51) Int. Cl.
*H04N 5/335*  (2011.01)
*G06T 7/62*  (2017.01)
(Continued)

(52) U.S. Cl.
CPC .............. *H04N 25/11* (2023.01); *G06T 7/62* (2017.01); *G06T 7/90* (2017.01); *G06V 10/56* (2022.01);
(Continued)

(58) Field of Classification Search
CPC ..................................... H04N 25/11
See application file for complete search history.

(56) References Cited

U.S. PATENT DOCUMENTS 10,122,951 B2 * 11/2018 Takado ............ H04N 23/95
11,605,153 B1 *  3/2023 Price .............. G06T 3/4015
(Continued)

FOREIGN PATENT DOCUMENTS

| CN | 101233763 A | 7/2008 |
| CN | 101783354 A | 7/2010 |

(Continued)

OTHER PUBLICATIONS

International Search Report and Written Opinion mailed on Mar. 16, 2021, received for PCT Application PCT/JP2020/048890, filed on Dec. 25, 2020, 9 pages including English Translation.

(Continued)

*Primary Examiner* — Gary C Vieaux
(74) *Attorney, Agent, or Firm* — XSENSUS LLP

(57) ABSTRACT

Object detection is performed for an image acquired by imaging using an array sensor in which a plurality of imaging elements are arranged one-dimensionally or two-dimensionally, some of the imaging elements are configured as color-filter-disposed pixels in which a color filter is disposed in an incident optical path, and color information acquisition points are formed by the color-filter-disposed pixels. Then, coloring processing in a pixel range of a detected object is performed by referring to color information acquired at the color information acquisition points corresponding to the inside of the pixel range of the detected object.

12 Claims, 24 Drawing Sheets

(51) Int. Cl.
 *G06T 7/90* (2017.01)
 *G06V 10/56* (2022.01)
 *G06V 10/60* (2022.01)
 *H04N 25/11* (2023.01)
(52) U.S. Cl.
 CPC .... *G06V 10/60* (2022.01); *G06T 2207/10024* (2013.01); *G06V 2201/07* (2022.01)

(56) References Cited

U.S. PATENT DOCUMENTS

| | | | |
|---|---|---|---|
| 2007/0076269 | A1 | 4/2007 | Kido |
| 2007/0159542 | A1* | 7/2007 | Luo .................. H04N 25/134 348/E9.01 |
| 2008/0316326 | A1 | 12/2008 | Wada |
| 2009/0285476 | A1 | 11/2009 | Choe |
| 2011/0058064 | A1 | 3/2011 | Hatano |
| 2013/0027560 | A1* | 1/2013 | Seger ................ H04N 25/133 348/E9.005 |
| 2014/0125838 | A1 | 5/2014 | Mackey |
| 2018/0007324 | A1 | 1/2018 | Chen |
| 2018/0089532 | A1 | 3/2018 | Xu |
| 2018/0188427 | A1 | 7/2018 | Brueckner |

FOREIGN PATENT DOCUMENTS

| | | |
|---|---|---|
| CN | 102870405 A | 1/2013 |
| CN | 103533262 A | 1/2014 |
| CN | 103650487 A | 3/2014 |
| CN | 204697179 U | 10/2015 |
| CN | 106210572 A | 12/2016 |
| CN | 108695351 A | 10/2018 |
| CN | 109819136 A | 5/2019 |
| CN | 208970511 U | 6/2019 |
| JP | 2011-199798 A | 10/2011 |
| JP | 2013524664 A | 6/2013 |
| JP | 2014-515587 A | 6/2014 |
| JP | 2014161022 A | 9/2014 |
| JP | 2015-50494 A | 3/2015 |
| JP | 2015-106791 A | 6/2015 |
| JP | 2018537742 A | 12/2018 |
| JP | 2019-122045 A | 7/2019 |
| WO | WO-2015074915 A1 | 5/2015 |

OTHER PUBLICATIONS

Chakrabarti, Ayan, et al, "Rethinking Color Cameras", 2014 IEEE International Conference Oncomputational Photography (ICCP), IEEE, May 2, 2014 (May 2, 2014), pp. 1-8.

Chen, Ying, et al, "Image colourisation using linear neighbourhood propagation and weighted smoothing", IET Image Processing, IET, vol. 11, No. 5, May 1, 2017 (May 1, 2017), pp. 285-291.

Luo, Gang, "A novel color filter array with 75% transparent elements", Proceedings of SPIE, vol. 6502, Feb. 15, 2007 (Feb. 15, 2007), pp. 1-8, XP093015632, ISSN: 0277-786X, DOI : 10.1117/12.702950.

Sharif, S. M. A., et al., "Deep color reconstruction for a sparse color sensor", Optics Express, vol. 27, No. 17, Aug. 5, 2019 (Aug. 5, 2019), pp. 23661-23681, XP055832582,DOI: 10.1364/0E.27.023661.

Richard Zhang et al. , "Real-time user-guided image colorization with learned deep priors" , ACM Transactions on Graphics , Jul. 20, 2017, vol. 36 , No. 4 , p. 1-11.

* cited by examiner

A ACTUAL

B MONOCHROME IMAGE

C AUTOMATIC COLOR

A ACTUAL

B MONOCHROME IMAGE

C AUTOMATIC COLORATION

IMAGE PROCESSING METHOD AND SENSOR DEVICE FOR PERFORMING COLORING PROCESSING ON AN IMAGE SIGNAL ACQUIRED USING AN ARRAY SENSOR

CROSS-REFERENCE TO RELATED APPLICATIONS

The present application is based on PCT filing PCT/JP2020/048890, filed Dec. 25, 2020, which claims priority to JP 2020-025952, filed Feb. 19, 2020, the entire contents of each are incorporated herein by reference.

TECHNICAL FIELD

The present technology relates to an image processing method and a sensor device, and more particularly, to a technology for assuming a coloring processing on an image signal acquired using an array sensor.

BACKGROUND ART

In an image sensor in which imaging elements are arranged, a so-called Bayer array in which the number of green color filters is twice the number of red filters and the number of blue filters, and rows in which R (red)-G (green) filters are aligned and rows in which G (green)-B (blue) filters are aligned are alternately arranged may be formed.

PTL 1 described below discloses a color filter array using an array including colors different from those of a Bayer array (yellow, cyan, and the like).

CITATION LIST

Patent Literature

[PTL 1]
JP 2019-122045 A

SUMMARY

Technical Problem

In the field of image sensors, there are requests for implementation of high sensitivity and high resolution.

First, in view of implementing high sensitivity, the number of photons incident on an imaging element needs to be raised, and for this reason, increasing the size of a pixel (an imaging element) or reducing incident photon loss may be considered.

When focusing on loss in the number of incident photons, a major factor is absorption using color filters. In a color filter, a loss of about 66% occurs. However, a color separation three-plate system and the like that do not use any color filters are not considered to be reasonable in terms of cost, and a system using color filters has superiority in terms of cost and has relatively good color reproducibility and thus is widely used, and accordingly, there are many cases in which loss in the number of incident photons due to color filters cannot be avoided. For this reason, for example, a small-size image sensor in which it is difficult to increase the number of incident photons in accordance with an increase in the pixel size is disadvantageous in the aspect of improvement of sensitivity.

In addition, in a case in which color filters of a Bayer array are used, the resolution becomes ¼ of that of an actual number of pixels, and thus it is disadvantageous in implementation of high resolution. Furthermore, in accordance with a low-pass filter process on a color moire and a false color, the resolution may be decreased.

In view of such situations, the present disclosure proposes a technology that is able to realize implementation of high sensitivity and high resolution.

Solution to Problem

According to the present technology, there is provided an image processing method including: performing object detection for an image acquired by imaging using an array sensor in which a plurality of imaging elements are arranged one-dimensionally or two-dimensionally, some of the imaging elements are configured as color-filter-disposed pixels in which a color filter is disposed in an incident optical path, and color information acquisition points are formed by the color-filter-disposed pixels; and performing coloring processing in a pixel range of a detected object by referring to color information acquired at the color information acquisition points corresponding to the inside of the pixel range of the detected object.

The array sensor is an image sensor performing imaging, in which color filters are disposed in some pixels, and no color filters are disposed in other pixels. Thus, only luminance information is acquired from the other pixels, and by performing coloring processing for this, a color image is generated. In this case, together with performing object detection, information of the color information acquisition points according to the pixels in which color filters are disposed is used for coloring a pixel range of the object.

In the image processing method according to the present technology described above, in the coloring processing, performing coloring of the pixel range of the detected object by setting candidate colors in the detected object using a color estimating process based on learning data and selecting a candidate color on the basis of the color information acquired from the color information acquisition points may be considered.

In other words, in the coloring processing, first, detection of an object inside an image is performed, and candidate colors are set in accordance with a class (type) of the object. By using color information acquired at the color information acquisition points among the candidate colors, a candidate color that is close to an actual color is selected.

According to the present technology, there is provided a sensor device including: an array sensor in which a plurality of imaging elements are arranged one-dimensionally or two-dimensionally, some of the imaging elements are configured as color-filter-disposed pixels in which a color filter is disposed in an incident optical path, and color information acquisition points are formed by the color-filter-disposed pixels; and an arithmetic operation unit performing object detection for an image acquired by imaging using the array sensor and performing coloring processing in a pixel range of a detected object by referring to color information acquired at the color information acquisition points corresponding to the inside of the pixel range of the detected object.

The arithmetic operation unit performs processing on an image (image signal) captured by the array sensor having color information acquisition points formed by pixels in which color filters are disposed. In this case, together with performing object detection, information of the color information acquisition points according to the pixels in which color filters are disposed is used for coloring a pixel range of the object.

In the sensor device according to the technology described above, the arithmetic operation unit performing coloring processing of the pixel range of the detected object by setting candidate colors in the detected object using a color estimating process based on learning data and selecting a candidate color on the basis of the color information acquired from the color information acquisition points may be considered.

The arithmetic operation unit performs detection of an object inside an image acquired by the array sensor and sets candidate colors in accordance with a class (type) of the object. By using color information acquired at the color information acquisition points among the candidate colors, a candidate color that is close to an actual color is selected.

In the sensor device according to the technology described above, the arithmetic operation unit generating a color layer on the basis of the candidate color selected on the basis of the color information acquired from the color information acquisition points and generating a color image by combining the color layer and a luminance information image acquired from the array sensor may be considered.

In other words, in the coloring processing, a color image is generated by combining a color layer and a luminance information image.

In the sensor device according to the technology described above, the arithmetic operation unit performing luminance correction of pixels corresponding to the color information acquisition points for the luminance information image acquired from the array sensor and combining the luminance information image and the color layer may be considered.

In the luminance information image, pixels set as color information acquisition points are pixels in which color filters are disposed and thus have lower sensitivity than other pixels. Thus, luminance correction is performed.

In the sensor device according to the technology described above, a total area of pixels not forming the color information acquisition points may be considered to be configured to exceed 25% of a total area of all the effective pixels on the array sensor.

In an array sensor, pixels in which color filters are disposed (hereinafter also referred to as "color pixels") configuring color information acquisition points and pixels in which no color filters are disposed (hereinafter referred to as "clear pixels") are provided, and a total area of the clear pixels exceeds 25% of all the entire effective pixels.

In the sensor device according to the technology described above, the color information acquisition points being discretely disposed in the array sensor may be considered.

One unit of the color information acquisition points is formed by one or a plurality of color pixels. These color information acquisition points of one unit are discretely disposed in the pixels that are arranged one-dimensionally or two-dimensionally.

In the sensor device according to the technology described above, the color information acquisition points being disposed at constant intervals in the array sensor may be considered.

The color information acquisition points of one unit are disposed at constant intervals in the pixels arranged one-dimensionally or two-dimensionally.

In the sensor device according to the technology described above, the color information acquisition points being disposed at non-constant intervals in the array sensor may be considered.

The color information acquisition points of one unit may be randomly disposed, centrally disposed, or disposed in a spread manner, or disposed in the form of a line without being disposed at constant intervals in the pixels that are arranged one-dimensionally or two-dimensionally.

In the sensor device according to the technology described above, configuring one unit of the color information acquisition points using a plurality of adjacent pixels may be considered.

For example, the color information acquisition point of one unit is configured using two or more pixels that are adjacent to each other in a vertical direction, a horizontal direction, or a diagonal direction of the array sensor.

In the sensor device according to the technology described above, configuring one unit of the color information acquisition points using a plurality of adjacent pixels and includes an R pixel, a G pixel, and a B pixel may be considered.

For example, the color information acquisition point of one unit is configured using a red (R) pixel, a green (G) pixel, and a blue (B) pixel that are adjacent to each other in a vertical direction, a horizontal direction, or a diagonal direction of the array sensor.

In the sensor device according to the technology described above, configuring one unit of the color information acquisition points using a plurality of adjacent pixels and including an R pixel, a G pixel, a B pixel, and a pixel of another color may be considered.

For example, the color information acquisition point of one unit is configured using an R pixel, a G pixel, a B pixel, and a pixel of another color that are adjacent to each other in a vertical direction, a horizontal direction, or a diagonal direction of the array sensor.

In the sensor device according to the technology described above, configuring one unit of the color information acquisition points using one pixel, and the color information acquisition points being discretely disposed in the array sensor may be considered.

For example, the color information acquisition point of one unit is configured by one pixel in which a color filter transmitting a certain color is disposed, and such pixels are discretely disposed.

According to the present technology, there is provided a sensor device including an array sensor in which a plurality of imaging elements are arranged one-dimensionally or two-dimensionally, some of the imaging elements are configured as color-filter-disposed pixels in which a color filter is disposed in an incident optical path, color information acquisition points are formed by the color-filter-disposed pixels, and a total area of pixels not forming the color information acquisition points exceeds 25% of a total area of all the effective pixels on the array sensor.

In other words, an area of pixels in which no color filter is disposed (clear pixels) is secured to exceed at least ¼.

According to the present technology, there is provided a sensor device including an array sensor in which a plurality of imaging elements are arranged one-dimensionally or two-dimensionally, some of the imaging elements are configured as color-filter-disposed pixels in which a color filter is disposed in an incident optical path, color information acquisition points are formed by the color-filter-disposed pixels, and the color information acquisition points are discretely disposed.

The color information acquisition points of one unit formed by one or a plurality of color pixels are discretely disposed in pixels that are arranged one-dimensionally or two-dimensionally.

DESCRIPTION OF EMBODIMENTS

Hereinafter, an embodiment will be described in the following order.
<1. Configuration of Sensor Device>
<2. Coloring Using Machine Learning>
<3. Sensor Structure and Coloring Processing according to Embodiment>
<4. Disposition and Configuration of Color Information Acquisition Points>
<5. Another Example of Configuration of Sensor Device>
<6. Conclusion and Modified Example>

Further, as an embodiment described below, a sensor device 1 serving as an image sensor that has an imaging element array and outputs an image signal as a detection signal will be described as an example. Particularly, the sensor device 1 according to the embodiment is a device that has an object detection function using image analysis and can be referred to as an intelligent array sensor.

1. Configuration of Sensor Device

Figure 1:
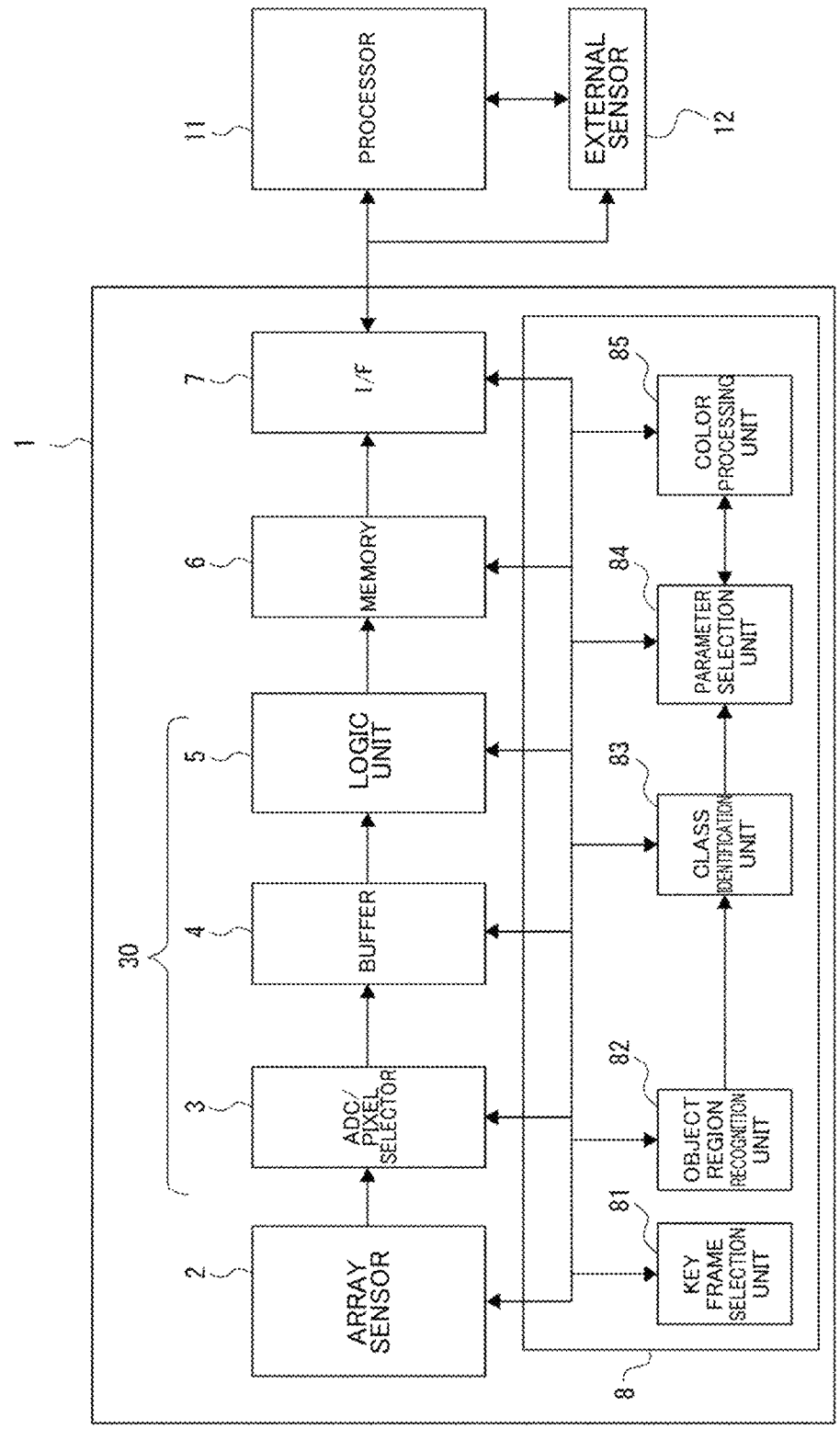
FIG. 1 is a block diagram showing a sensor device according to an embodiment of the present technology.

An example of a configuration of the sensor device 1 is illustrated in FIG. 1. Further, FIG. 1 also illustrates a processor 11 and an external sensor 12 as external devices that perform data communication with the sensor device 1. The processor 11 is assumed to be all the processors connected to the sensor device 1 to be able to communicate therewith.

The sensor device 1 includes, as hardware, an image sensor device, a memory area of a dynamic random access memory (DRAM) or the like, and a component part as an artificial intelligence (AI) functional processor. In addition, these three components are combined into an integrated device in a 3-layer stack structure, a 1-layer so-called horizontally mounted configuration, a 2-layer (for example, the DRAM and the AI functional processor are on the same layer) stack structure, or the like.

As illustrated in FIG. 1, the sensor device 1 includes an array sensor 2, an analog to digital converter (ADC)/pixel selector 3, a buffer 4, a logic unit 5, a memory 6, an interface unit 7, and an arithmetic operation unit 8.

The ADC/pixel selector 3, the buffer 4, and the logic unit 5 serve as a signal processing unit 30 that performs signal processing on a detection signal acquired by the array sensor 2 for outputting the signal to the outside.

The array sensor 2 is configured such that detection elements are imaging elements for visible light or invisible light, and a plurality of imaging elements are arrayed 1-dimensionally or 2-dimensionally. For example, the array sensor 2 has a configuration in which a plurality of imaging elements are two-dimensionally arranged in a row direction and a column direction and a two-dimensional image signal is output according to photoelectric conversion in each of the imaging elements.

The ADC/pixel selector 3 converts an electric signal that is photoelectrically converted by the array sensor 2 into digital data and outputs an image signal as the digital data.

In addition, the ADC/pixel selector 3 may have a pixel selection function for pixels (imaging elements) of the array sensor 2 and be configured to read photoelectrically converted signals only for pixels selected in the array sensor 2, convert read signals into digital data, and output the digital data. In other words, while the ADC/pixel selector 3 normally converts photoelectrically converted signals of all the effective pixels configuring an image of one frame into digital data and outputs the digital data, the ADC/pixel selector 3 may convert photoelectrically converted signals of only selected pixels into digital data and output the digital data.

Although an image signal is read using the ADC/pixel selector 3 in units of frames, an image signal of each frame is temporarily stored in the buffer 4, read out at an appropriate timing, and provided for processing of the logic unit 5.

The logic unit 5 performs various kinds of necessary signal processing (image processing) on each frame image signal that is input.

For example, it is assumed that image quality adjustment is performed using processing such as color correction, gamma correction, color gradation processing, gain processing, contour emphasis processing, contrast adjustment processing, sharpness adjustment processing, a gray level adjustment process, and the like in the logic unit 5.

In addition, it is also assumed that processing of changing a data size such as data compression processing, resolution conversion, frame rate conversion, aspect ratio conversion, sampling rate change, or the like is performed in the logic unit 5.

Parameters used for each process performed in the logic unit 5 are set. For example, there are setting values such as color and luminance correction coefficients, a gain value, a compression rate, a frame rate, a resolution, a processing target area, a sampling rate and the like. The logic unit 5 performs necessary processing using parameters set in each process. In this embodiment, the arithmetic operation unit 8 may set these parameters.

Image signals processed by the logic unit 5 are stored in the memory 6. Image signals stored in the memory 6 are transmitted and output to the processor 11 or the like through the interface unit 7 at a necessary timing. Further, a DRAM, a static random access memory (SRAM), a magnetoresistive random access memory (MRAM), and the like are conceivable as the memory 6.

In addition, an MRAM is a memory that stores data using magnetism and is known to use a tunneling magnetoresistive (TMR) element instead of a magnetic core. A TMR element has an extremely thin insulating layer of several atoms interposed between magnetic substances, and an electrical resistance thereof varies according to a direction of magnetization of the layer of the magnetic substances. A magnetization direction of a TMR element does not change even when power is not supplied, and thus it may serve as a nonvolatile memory. Since a write current needs to increase in accordance with the progress of miniaturization, a spin torque transfer (STT)-MRAM using an STT in which electrons with uniform spin flow for writing without using a magnetic field is known for miniaturization of a memory cell.

It is apparent that storage elements other than these may be conceived as a specific example of the memory 6.

The processor 11 outside the sensor device 1 performs necessary object detection and the like by performing image analysis and image recognition processing on an image signal transmitted from the sensor device 1. Alternatively, the processor 11 may perform signal processing for storage, communication, display, and the like of an image signal.

The processor 11 can also refer to detection information of the external sensor 12. In addition, connecting the processor 11 to the sensor device 1 in a wired or wireless manner can be considered.

This processor 11 being disposed in a casing that is common to the sensor device 1 can be considered. For example, the processor 11 may be regarded as a processor inside an imaging apparatus or a terminal device equipped with the sensor device 1.

Alternatively, the processor 11 may be disposed in a device the is separate from the sensor device 1. For example, the processor 11 may be built into an information processing apparatus, a terminal device, an image editing device, a monitor device, a communication device, or the like that is connected to an imaging apparatus or a terminal device equipped with the sensor device 1 through a cable, wireless communication, or the like.

Furthermore, the processor 11, for example, may be regarded as a processor in a cloud computing system and may communicate with the sensor device 1 or a device in which the sensor device 1 is built in through a network.

The arithmetic operation unit 8 is configured, for example, as one AI processor. As illustrated in the drawing, the arithmetic operation unit 8 includes a key frame selection unit 81, an object region recognition unit 82, a class identification unit 83, a parameter selection unit 84, and a color processing unit 85 as executable arithmetic operation functions. Further, these arithmetic operation functions may be configured using a plurality of processors.

The key frame selection unit 81 performs processing of selecting a key frame from among frames of an image signal as a moving image using an algorithm to be described below in accordance with a predetermined algorithm or instruction.

The object region recognition unit 82 performs detection of a region of an object that is a candidate for detection and processing of recognizing an area of an object, which is a detection target, within an image (frame) for a frame of an image signal that is photoelectrically converted by the array sensor 2 and is read by the ADC/pixel selector 3.

An object detected from an image signal is an object that can be a detection target for the purpose of recognition from an image. Although an object that is configured as a detection target is different depending on detection purposes, processing capabilities, application types, and the like of the sensor device 1 and the processor 11, any object has a possibility of being an object that is a detection target mentioned here. Some examples of possible detection targets include animals, moving objects (vehicles, bicycles, aircraft, and the like), natural objects (vegetables, plants, and the like), industrial products/parts, buildings, facilities, mountains, seas, rivers, stars, the sun, and clouds.

The class identification unit 83 classifies an object detected by the object region recognition unit 82 into a class.

A class is a category of an object recognized using image recognition. For example, objects to be detected are divided into classes such as "humans", "vehicles", "aircraft", "vessels", "trucks", "birds", "cats", "dogs", "deer", "frogs", "horses", and the like.

The parameter selection unit 84 stores parameters used for signal processing according to each class and selects one or more corresponding parameters using a class of a detected object identified by the class identification unit 83, an area thereof, and the like. Then, the parameter selection unit 84 sets the one or more parameters in the logic unit 5.

The color processing unit 85, which will be described below in detail, is a function of performing coloring processing on an image signal acquired by the array sensor 2.

In the case of this embodiment, an image signal of each frame is acquired as a monochrome image from the array sensor 2. By performing coloring processing on the image signal, a color image is generated. For this reason, setting of a candidate color based on machine learning and selection of a candidate color using color information according to the color information acquisition points 90 to be described below are performed, whereby a colored image signal is generated.

In addition, a monochrome image described in the present disclosure not only represents an image of only two gradations of black and white but also includes an image according to luminance information of multiple gradations, known as a gray scale.

Such a function according to the arithmetic operation unit 8 is processing that is not performed inside a general array sensor, and object detection, class recognition, coloring processing, and the like are performed inside the array sensor in this embodiment. In accordance with this, an image signal supplied to the processor 11 is assumed to have high quality.

In addition, the interface unit 7 may output information of an object, information of a class, the number of detected objects, information of a selected parameter, and the like detected by the arithmetic operation unit 8, for example, as meta data together with an image signal in addition to outputting of the image signal to the processor 11 or may output such information independently from an image signal. Furthermore, for example, it may be configured such that only the information of a class is output.

In addition, for example, the processor 11 side instructing the interface unit 7 of necessary information, and the interface unit 7 outputting information corresponding thereto may be considered.

Here, object detection and parameter control using the key frame selection unit 81, the object region recognition unit 82, the class identification unit 83, and the parameter selection unit 84 will be simply described.

The key frame selection unit 81 performs processing of selecting a key frame at a timing corresponding to a key frame selection algorithm By selecting a key frame from an image signal in units of frames that is a pixel array output signal of the array sensor 2 and performing image recognition, the sensor device 1 recognizes a class of a subject that is an imaging target. The selection of a key frame is performed using a key frame selection algorithm, and in accordance with this, a still image (one certain frame) is selected.

An example of the key frame selection algorithm will be described.

First, there is a technique for selecting one frame at every designated time interval. For example, one frame is set as a key frame at the interval of 30 seconds. It should be apparent that 30 seconds is one example.

In addition, as a timing according to a command from the outside (the processor 11 and the like) of the sensor device 1, selecting a key frame may be considered. For example, the selection is performed in accordance with an instruction from a device or an instrument in which the sensor device 1 is mounted. For example, in a case in which the sensor device 1 is mounted in a car, the car is stopped in a parking lot, and then a key frame is selected at a timing at which traveling starts or the like.

In addition, a technique for selecting a key frame may be changed in accordance with situations. For example, in a case in which the sensor device 1 is mounted in a vehicle, an interval of a key frame is changed at the time of stopping, the time of normal traveling, and the time of high-speed traveling or the like.

When a key frame is selected, the object region recognition unit 82 detects positions of candidates for objects within the key frame.

In other words, the object region recognition unit 82 searches for candidates for objects to be detected in an image of the key frame and acquires positions of one or a plurality of candidates (positional coordinates within the image).

The class identification unit 83 divides detected objects into classes. In other words, class identification of each of candidates for objects is performed for classification.

As described above, a class is a category of an object recognized using image recognition. For example, classes of detected objects such as "humans" and "flowers" are identified.

The parameter selection unit 84 performs parameter control according to classes acquired as a result of class identification.

For example, the parameter selection unit 84 selects a parameter set on the basis of classes, numbers, areas, and the like of objects.

For example, in a case in which there is one class within an image, the parameter selection unit 84 selects a parameter set corresponding to the class. For example, in a case in which "humans" is present among identified classes, the parameter selection unit 84 selects a parameter set that is appropriate for an image of humans.

In a case in which objects of a plurality of types of classes are present within a screen, the following example may be considered.

For example, selecting a parameter set corresponding to a class of which the number of objects is the largest among the classes may be considered.

Alternatively, in a case in which objects of classes of a plurality of types are present within the screen, selecting a parameter set corresponding to a class of which an area of objects is the largest may be considered.

Alternatively, in a case in which objects of classes of a plurality of types are present within the screen, selecting a parameter set corresponding to a class of which a total sum of areas is the largest for each class may be considered.

Alternatively, in a case in which objects of classes of a plurality of types are present within the screen, selecting a class of highest priority is acquired from the number of objects and a total sum (or a maximum value) of areas for each class, and a parameter set corresponding to the class may be considered. Certainly, although there are various other techniques for selecting a parameter set, a parameter set corresponding to a dominant object within the screen or a class of an object to be detected with priority may be selected.

Then, the parameter selection unit 84 sets the selected parameter set in the logic unit 5.

In accordance with this, the logic unit 5 performs various kinds of image processing using the set parameter set on an image signal of each frame sequentially input thereafter.

Information of processed image signals, set parameters, identified classes, and the like is temporarily stored in the DRAM 6.

The sensor device 1 outputs information of all or at least any one of an image signal (a still image or a moving image), class identification information (a class, the number of objects, and the like), the used parameter set, and the like in response to the request from the processor 11.

In other words, any one piece of the information that is temporarily stored in the memory 6 is read and transmitted by the interface unit 7 in response to a request from the processor 11.

In addition, although this process may be in accordance with control of the arithmetic operation unit 8, the process may be performed by the processor 11 accessing the memory 6 through the interface unit 7.

In accordance with the processes described above, an image signal in which parameters are set in accordance with presence of a class as an object included in an image is supplied to the processor 11. The image signal may be an image signal on which image processing has been performed to have image quality that is appropriate for the class or an image signal on which image processing that is appropriate for detection of objects of the class has been performed.

In addition, although the arithmetic operation unit 8 has been described above as setting parameters of the logic unit 5 in accordance with a class, this process may not be performed.

2. Coloring Using Machine Learning

Here, situations in which the technology of the present disclosure has been reached will be described.

As described above, in the field of image sensors, there are requests for implementation of high sensitivity and high resolution.

First, from the point of implementation of high sensitivity, it is necessary to increase the number of photons incident in imaging elements.

In order to increase the number of incident photons, it may be considered to increase a pixel size or decrease a loss of incident photons. In a case in which the pixel size is fixed, it is important to reduce a loss of incident photons.

Here, as factors for a loss in incident photons, there are the following.

Surface reflection of a micro lens
Absorption according to a color filter
Reflection/absorption in a wiring layer
Reflection in an insulating film/silicon interface Among these, as a factor for a loss in incident light, the color filter is the most important. A loss of about 66% occurs in a color filter. However, owing to superiority in terms of costs and color reproducibility, a color filter system is widely employed.

In addition, when the implementation of high resolution (high definition) is considered, the resolution of a color image sensor is ¼ of that of a monochrome image sensor of the same number of pixels.

In many image sensors, color filters of R/G/B/G in the Bayer array are used. Filters of R, G, and B are attached to pixels from which not color information but only luminance is to be originally acquired, and coloration is performed by combining luminance values of R, G, and B adjacent to each other.

As a result, there is a structural problem in that the resolution of a sensor to which the Bayer array is applied is only ¼ of that of the original sensor.

In addition, in accordance with this, a false color appears due to occurrence of a color that is not actually present in a subject or a color moire occurs due to interference between a repeated pattern and a pixel array of image sensors. For this reason, the problems described above are reduced by blurring the image by performing low-pass filter processing, which may be a cause for further lowering the resolution.

Here, when the point of view is changed, it is conceivable that a color image signal of high sensitivity and high resolution can be acquired by acquiring a luminance information image from image sensors and performing coloring processing on a monochrome image (including a gray scale image) according thereto without disposing any color filter.

In image processing of recent years, coloration of a monochrome picture using machine learning is realized.

In other words, coloring of a monochrome picture is performed using object detection using machine learning. In object detection, by learning a large quantity of things in advance, positions of objects in an input image and detection of categories (that is, "class" described above) are performed. At the time of performing learning for this object detection, a color is also learned in advance together with the shape of the object.

By performing object detection using a monochrome image as an input and estimating a class of an object first, also a color of the class can be similarly estimated from learning data.

In addition, this machine learning also includes an object detection method using deep machine learning using a multi-layer neural network, so-called deep learning. Various algorithms are known for this machine learning for coloring and automatic coloring.

However, there is a limit in coloring using machine learning in the present situation.

Figure 2:
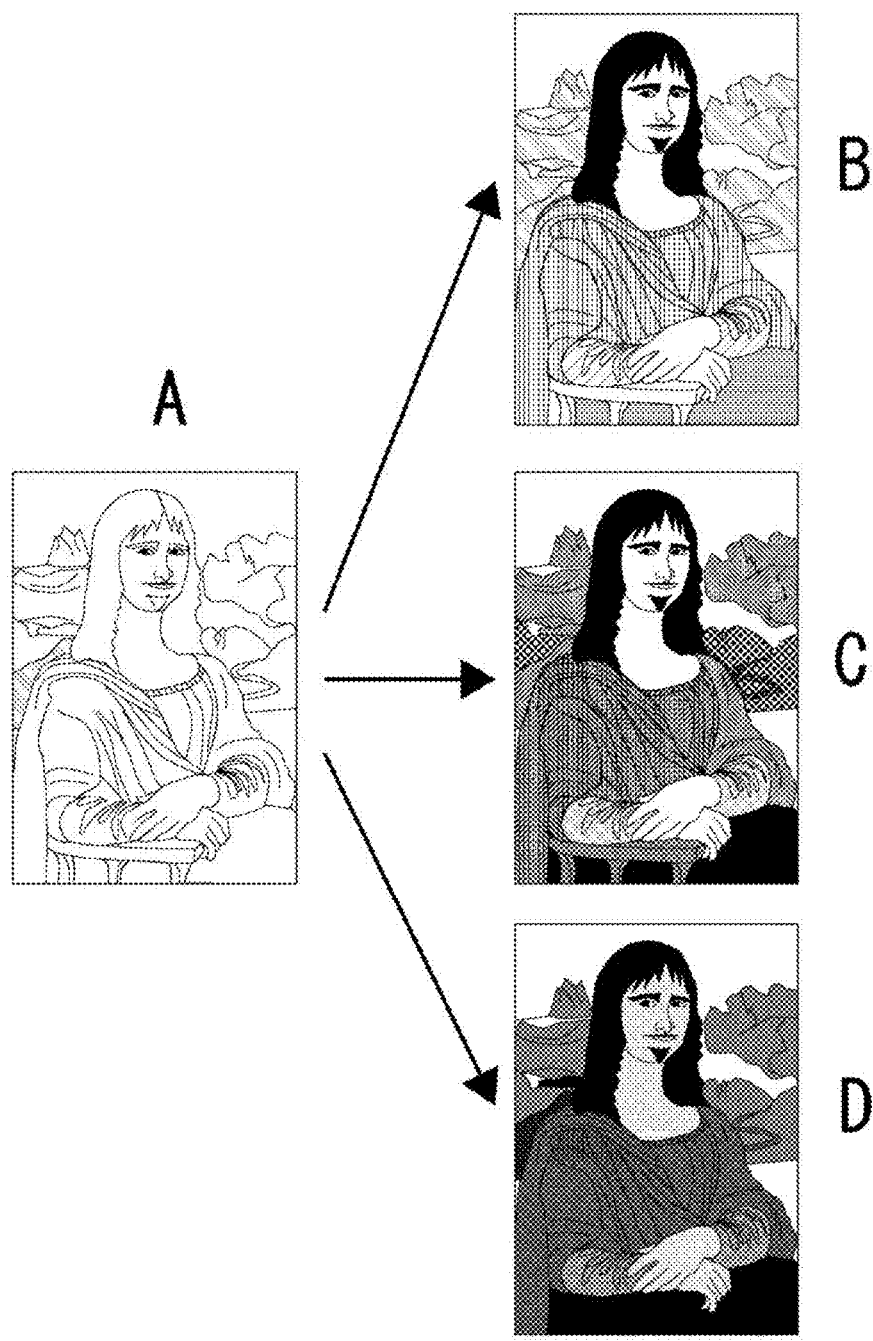
FIG. 2 is a diagram explaining color generation and coloring using machine learning.

For example, FIG. 2A schematically illustrates a monochrome image, and FIGS. 2B, 2C, and 2D schematically illustrate images that have been automatically colored on the basis of machine learning. In these drawings, different colors are represented using hatching, shades, and the like.

In automatic coloring based on machine learning, for example, part recognition is performed in units of pixels of an image using object detection of deep learning. Then, an entire area is colored by estimating a candidate color from learning data for each part. At this time, for example, as illustrated in FIGS. 2B, 2C, and 2D, a plurality of different candidate colors are derived, and a candidate color that is the most reliable is selected using a predetermined algorithm, and a color image for which coloring processing has been performed is output.

However, a candidate color is not necessarily determined uniquely in this way, and there is a limit on the selection algorithm, and thus a color image to be output may be in a state that is quite different from an actual color.

Figure 3:
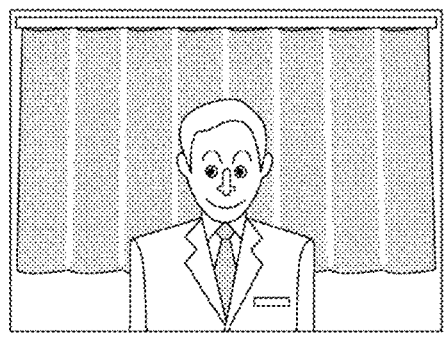
FIG. 3 is a diagram explaining coloration using machine learning.
Figure 3:
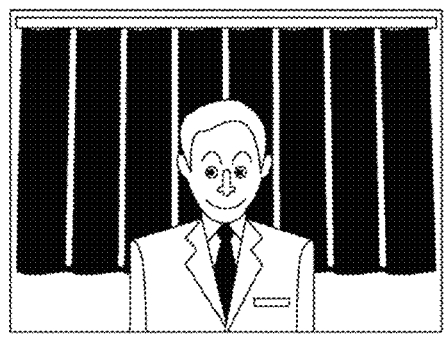
Figure 3:
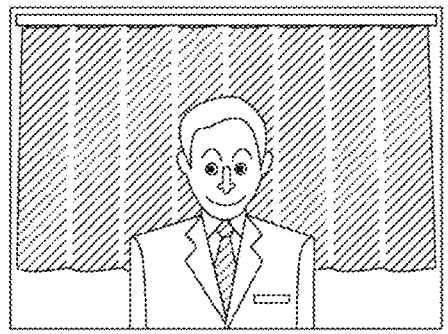

For example, FIG. 3A schematically illustrates an actual image, FIG. 3B schematically illustrates an image that has been monochromized using only luminance information of FIG. 3A, and FIG. 3C schematically illustrates an image that has been automatically colored using machine learning.

In the image illustrated in FIG. 3C, colors of a necktie and a curtain of the background are represented as colors that are different from actual colors.

Figure 4:
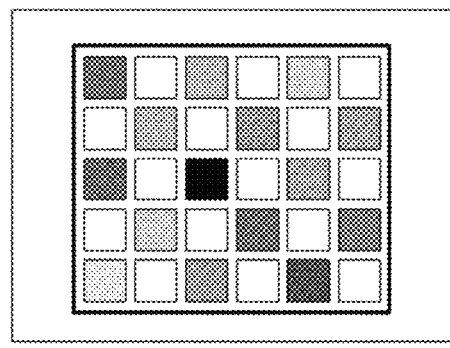
FIG. 4 is a diagram explaining coloration using machine learning.
Figure 4:
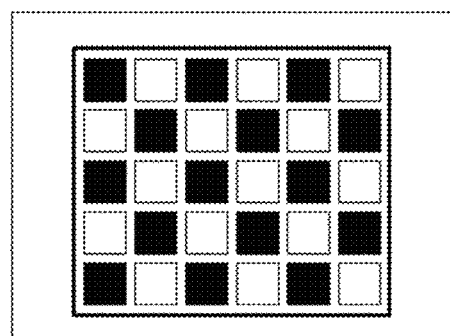
Figure 4:
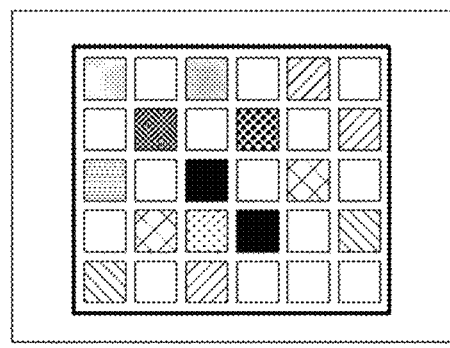

In addition, there are images for which it is very difficult to estimate colors using learning. For example, FIG. 4A schematically illustrates an actual image of a color palette, FIG. 4B schematically illustrates an image that has been monochromized using only luminance information of FIG. 4A, and FIG. 4C schematically illustrates an image that has been automatically colored using machine learning. It is very difficult to estimate disposition of colors of a color palette using machine learning. For this reason, it is difficult to cause an image that has been colored through automatic coloring to coincide with an actual image.

From these, it can be regarded that there is a limit on reproducibility of colors in automatic coloring based on machine learning.

Thus, in this embodiment, the following ideas are adopted.

By eliminating color filters or configuring clear (colorless) filters in the array sensor 2, the number of incident photons is increased, and implementation of high sensitivity is performed, whereby a monochrome image is acquired. In addition, in accordance with this, implementation of high resolution is achieved, and further, by resolving a color moire and a false color, occurrence of a decrease in resolution according to low-pass filter processing is prevented.

In addition, although coloring processing based on machine learning is performed for obtaining a color image from a monochrome image, at that time, actual color information is acquired from some pixels, and, the actual color information is reflected, whereby automatic coloring having higher reproducibility is realized.

In order to acquire actual color information, instead of disposing no color filter in the array sensor 2, some pixels are configured as color filter-disposed pixels in which a color filter is disposed in an incident optical path, and color information acquisition points are formed in accordance with these color filter-disposed pixels.

According to such an idea, compared to an image sensor using a Bayer array, which is commonly used, or any other colored color filter array, high sensitivity and high resolution are realized, and reproducibility of colors is secured.

3. Sensor Structure and Coloring Processing According to Embodiment

Figure 5:
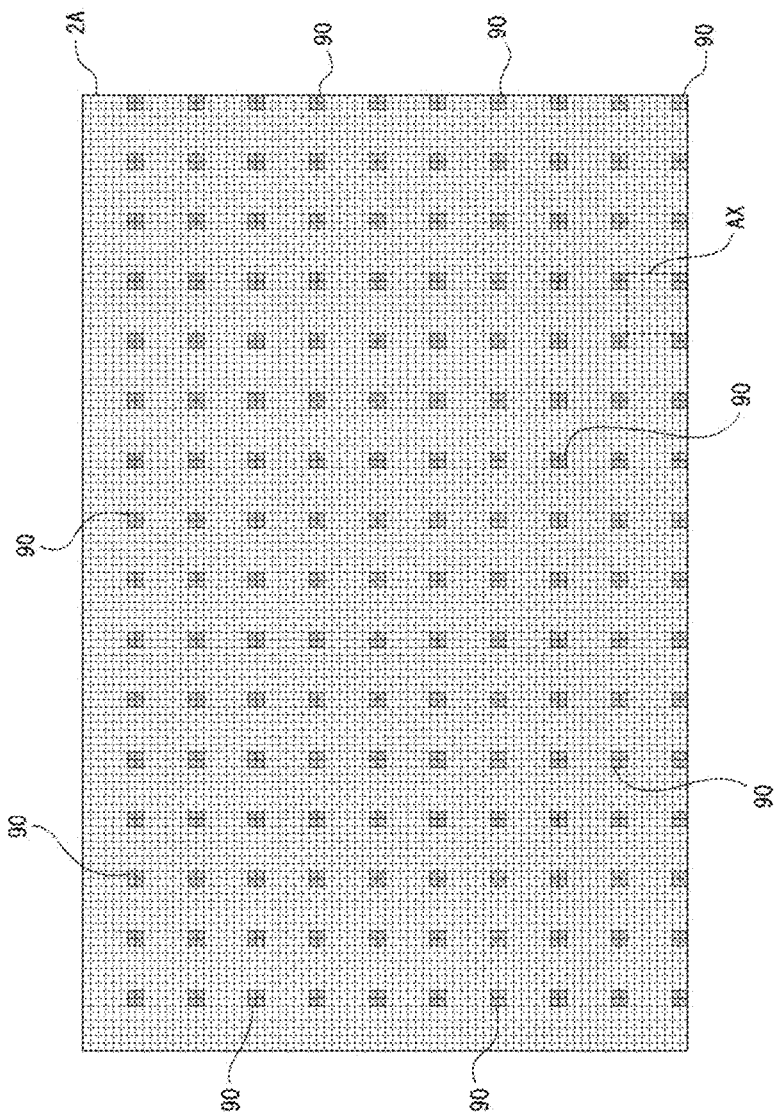
FIG. 5 is a diagram explaining color information acquisition points according to an embodiment.

An example of color information acquisition points 90 formed in a pixel array of the array sensor 2 in the sensor device 1 according to an embodiment is illustrated in FIG. 5.

FIG. 5 illustrates a pixel array face 2A of the array sensor 2, and one square is assumed to be one pixel that acquires luminance information.

In addition, in an actual image sensor, although there is a case in which dummy pixels are disposed in peripheral edge portions and the like in addition to effective pixels used for acquisition of luminance information, in the present disclosure, the dummy pixels will be ignored in description, and description will be presented in the range of the effective pixels.

FIG. 5 illustrates a state in which color information acquisition points 90 (pixels in which oblique lines are applied) are disposed at constant intervals in a vertical direction and a horizontal direction in the range of all the pixels regarded as effective pixels.

FIG. 6A is an enlarged view of a broken-line area AX illustrated in FIG. 5.

FIG. 6A illustrates an example in which a color information acquisition point 90 of one unit is formed using four pixels of an R pixel, a G pixel, a B pixel, and a G pixel of a Bayer array.

A square to which diagonal lines and "R" are assigned is the R pixel. A square to which diagonal lines and "G" are assigned is the G pixel. A square to which diagonal lines and "B" are assigned is the B pixel.

The R pixel is a pixel in which a color filter transmitting only R light is disposed in an incident optical path, the G pixel is a pixel in which a color filter transmitting only G light is disposed in an incident optical path, and the B pixel is a pixel in which a color filter transmitting only B light is disposed in an incident optical path.

A pixel represented by a square to which oblique lines are not assigned is a clear pixel.

The clear pixel is a pixel in which no color filter is disposed. More specifically, the clear pixel represents a pixel of which a filter part is clear (colorless) and does not function as a color filter or a pixel in which no filter is present.

In addition, in contrast to the clear pixel, a pixel in which a color filter is disposed will be referred to as a color pixel. In the case of this embodiment, a color pixel represents a pixel, in which a color filter is disposed, that configures the color information acquisition point 90.

The R pixel, the G pixel, and the B pixel illustrated in FIG. 6A are color pixels. A color pixel includes a pixel in which a filter of another color is disposed as well.

In addition, FIG. 6B illustrates an example in which a color information acquisition point 90 of one unit is formed by three pixels of an R pixel, a G pixel, and a B pixel. In this way, the color information acquisition point 90 is not limited to being configured by four pixels of the Bayer array. Various configuration examples of the color information acquisition point 90 will be described below.

Figure 6:
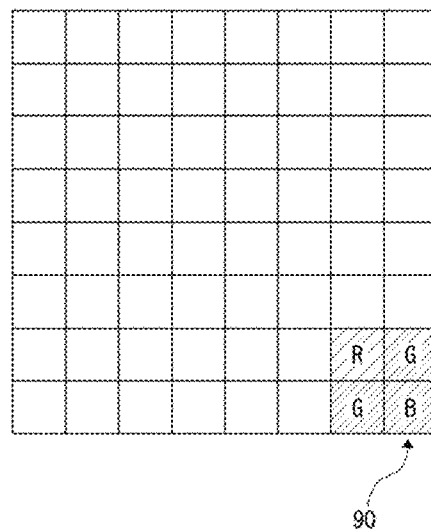
FIG. 6 is a diagram explaining a configuration of color information acquisition points according to an embodiment.
Figure 6:
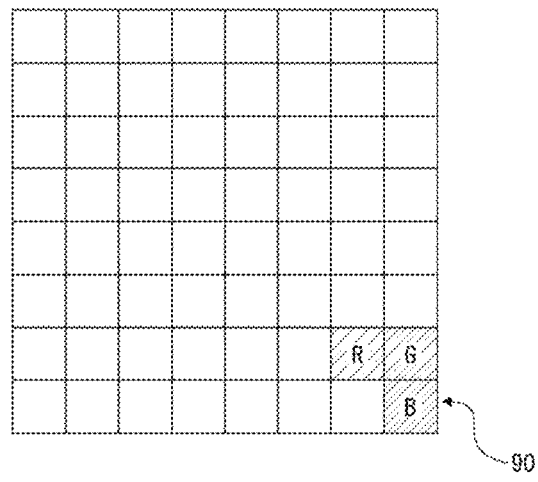

As can be understood from FIGS. 5 and 6, color information acquisition points 90 are discretely formed on the pixel array face 2A.

The color information acquisition point 90 is a minimum unit in which color filters are disposed in an arbitrary array and has a function of acquiring color information. Inside an image sensor, an area occupied by the color information acquisition point 90 is defined as a color area, and other areas that are areas in which a transparent filter or a filter is not disposed (an area of a clear pixel) is defined as a clear area.

The disposed places and the number of color information acquisition points 90 are different depending on an application. Variations will be described below.

In addition, a ratio between a color area and a clear area that occupy in the entire effective pixel area of the image sensor differs depending on the application.

As a ratio for which implementation of high sensitivity and implementation of high definition according to this embodiment are acquired as effects, the clear area is disposed in an area exceeding 25% of the entire area.

In the example illustrated in FIG. 5, it is apparent that the ratio of the clear area exceeds 25% of the entire area. In the example illustrated in FIG. 6A, 60 pixels among 64 pixels are clear pixels, and thus the clear area is 93.75%.

Figure 7:
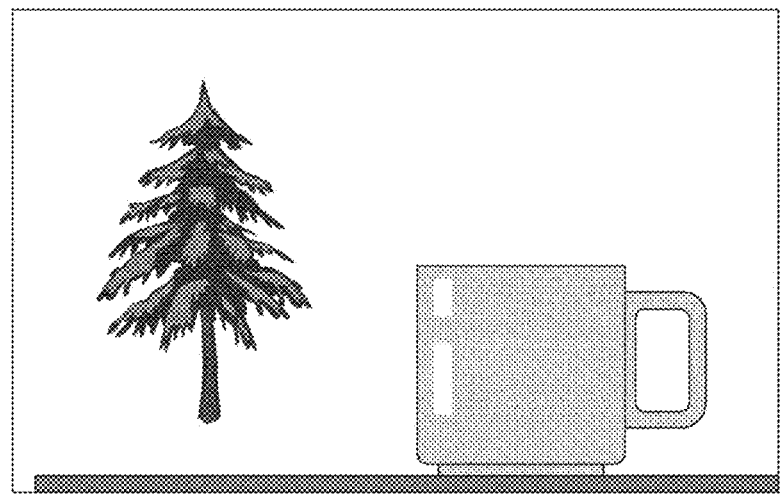
FIG. 7 is a diagram explaining color information acquisition points and a captured image according to an embodiment.
Figure 7:
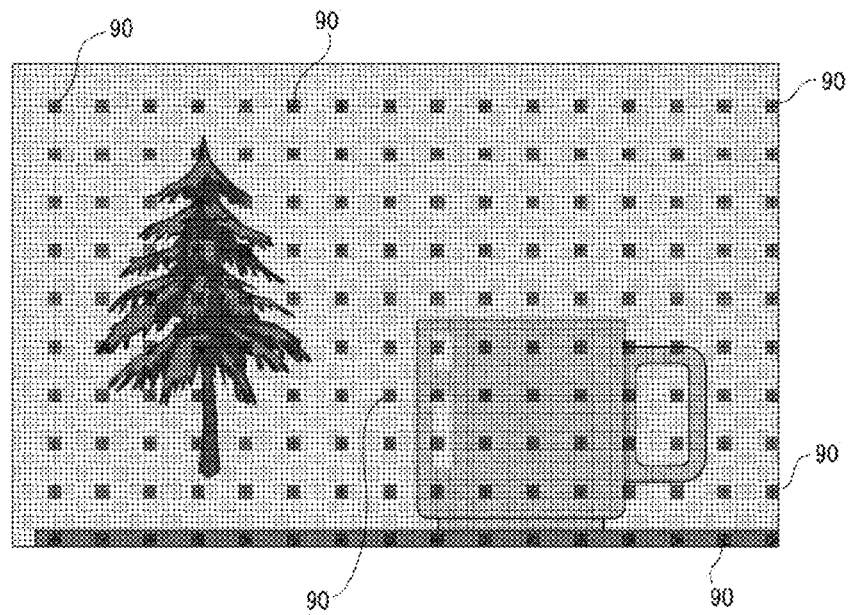

FIG. 7A illustrates an image of subjects captured by the array sensor 2, and FIG. 7B illustrates the image with being superimposed in the disposition state of the color information acquisition points 90 as illustrated in FIG. 5.

In this case, although a coffee cup and a tree of the background are drawn as subjects, it can be understood that several color information acquisition points 90 are present in an area corresponding to a pixel range of the coffee cup, and several color information acquisition points 90 are present in an area corresponding to a pixel range of the tree of the background.

One color information acquisition point 90 is configured to include the R pixel, the G pixel, and the B pixel as in FIGS. 6A and 6B, and thus, as color information acquired from pixels configuring the color information acquisition point 90, an actual color of the cup and an actual color of the tree of the background can be determined.

Figure 8:
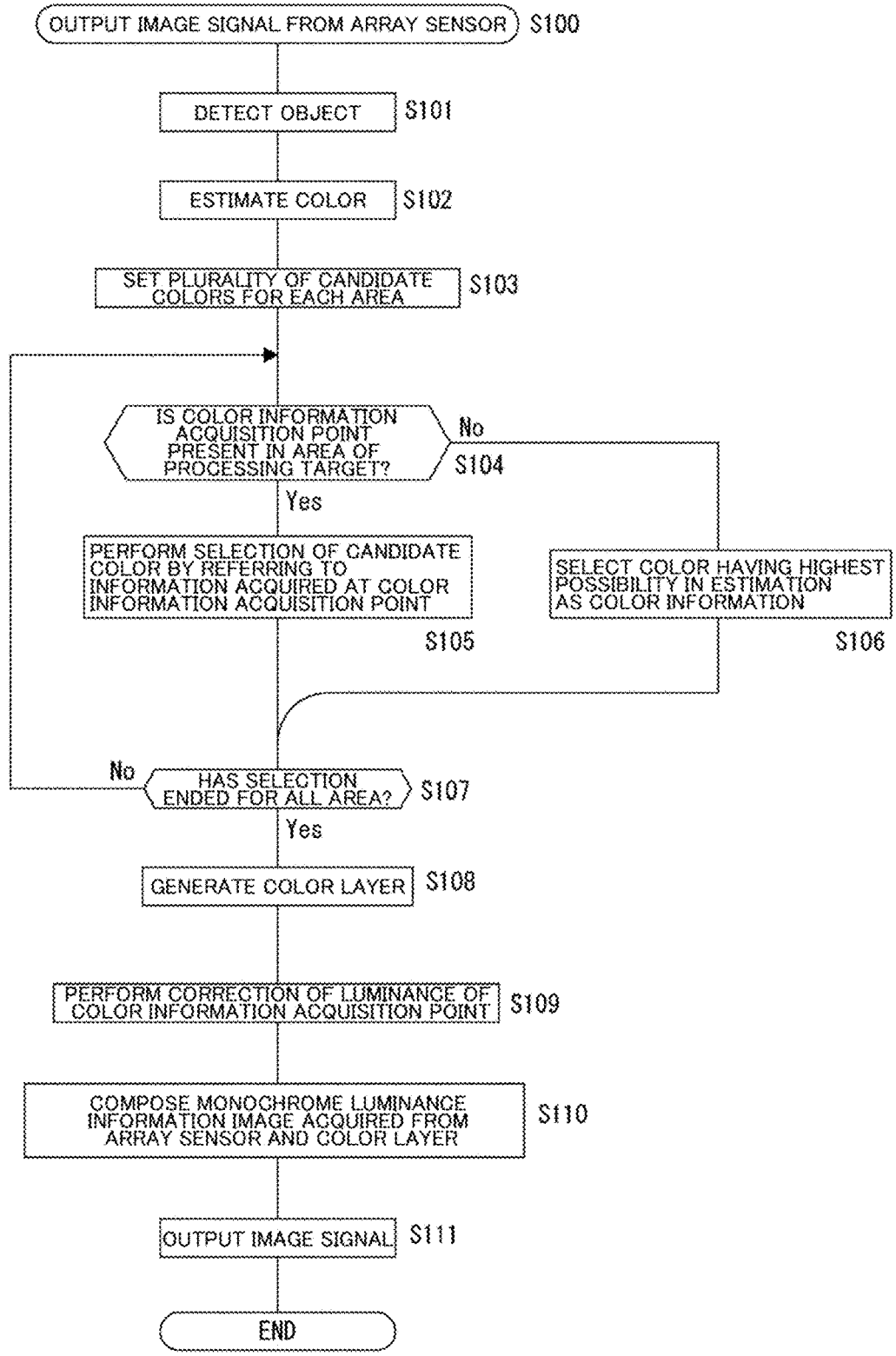
FIG. 8 is a flowchart of image processing according to an embodiment.

In the sensor device 1, the array sensor 2 in which such color information acquisition points 90 are disposed is used, and the arithmetic operation unit 8 performs coloring processing as in FIG. 8.

As Step S100 illustrated in FIG. 8, after output of an image signal in units of one frame from the array sensor 2 starts, processing performed by the arithmetic operation unit 8 is illustrated.

In addition, an image signal of one frame acquired from the array sensor 2 is a luminance information image signal as black and white (gray scale) of only luminance information. Here, for the color information acquisition point 90, color information representing an actual color of the part can be acquired.

In the processing of the arithmetic operation unit 8 illustrated in FIG. 8, Step S101 is processing that is performed mainly using functions of the key frame selection unit 81, the object region recognition unit 82, and the class identification unit 83 illustrated in FIG. 1, Step S102 and subsequent steps are processing that is performed mainly using the function of the color processing unit 85.

In Step S101, the arithmetic operation unit 8 performs detection of objects. In other words, objects are detected as described above for an image of one frame output from the array sensor 2, and a corresponding class is determined.

In Step S102, the arithmetic operation unit 8 performs color estimation. In other words, by using processing of machine learning using a class determined for each object and learning data, a color of the object is estimated. For example, in the case of a person's face, a color that is appropriate for a face is estimated on the basis of machine learning.

In Step S103, for each area inside an image, in other words, for each area of an object detected inside an image, the arithmetic operation unit 8 sets a plurality of candidate colors estimated using a result of machine learning.

For example, in the case of an image as illustrated in FIG. 7A, several candidate colors are set for an area of the pixel range in which the coffee cup is drawn, and several candidate colors are set for an area of the pixel range in which the background is drawn.

In Step S104, the arithmetic operation unit 8 sets one area among areas inside the image as a processing target and checks whether or not a color information acquisition point 90 is present inside the area. For example, it is checked whether or not a color information acquisition point 90 is present in an area as a pixel range corresponding to the coffee cup illustrated in FIG. 7B.

If a color information acquisition point 90 is present in the area that is a processing target, the arithmetic operation unit 8 proceeds to Step S105 and checks color information according to the corresponding color information acquisition point 90 inside the area. This color information, for example, is color information that is actually captured using color pixels of R, G, and B. Then, by referring to the actual color information, a closest candidate color is selected from among candidate colors of the area.

In this case, not only selection of a candidate color, but correction of the color set as the candidate color may be performed.

If no color information acquisition point 90 is present in the area that is the processing target, the arithmetic operation unit 8 proceeds to Step S106 and selects a candidate color that is regarded as a color having the highest likelihood.

In addition, in Step S106, for an area in which no object could be detected and no candidate color could be set, a process of selecting a color having the highest likelihood may be performed.

In Step S107, the arithmetic operation unit 8 checks whether or not the processing of Step S105 or Step S106 described above has been completed for each area inside the image and, in a case in which there is an area that has not been processed, returns to Step S104 and performs the processing for the area.

In addition, for an area in which no object could be recognized, a range of one area is determined on the basis of a luminance value and the like, and presence/absence of a color information acquisition point 90 is determined for the inside of the area in Step S104. Then, in a case in which the color information acquisition point 90 is present, color setting may be performed on the basis of color information according to the color information acquisition point 90 in Step S105. In addition, in a case in which no color information acquisition point 90 is present, processing of estimating a color having a high likelihood may be performed in Step S106.

When the processing of Step S105 or Step S106 is completed for all the areas, the arithmetic operation unit 8 proceeds from Step S107 to Step S108 and performs generation of a color layer.

The color layer is image layer information having saturation information of each pixel. In other words, the arithmetic operation unit 8 generates a color layer having saturation information of each pixel of one frame using the color selected in Steps S105 and S106 for each area.

In Step S109, the arithmetic operation unit 8 performs correction of luminance information of pixels configuring the color information acquisition point 90 for a luminance information image signal acquired by the array sensor 2.

The pixel configuring the color information acquisition point 90 is a color pixel in which color filters are disposed, and the number of incident photons are smaller than that of a clear pixel.

Thus, in the case of comparison using pixel values (luminance values of pixels) of a luminance information image, the luminance value of the pixel configuring the color information acquisition point 90 is lower than that of surrounding clear pixels.

Thus, for the luminance information image signal of one frame, the luminance value of the pixel configuring the color information acquisition point 90 is corrected to be raised. This correction is correction into a state in which the number of incident photons can be acquired in the same condition as that of the clear pixel.

For example, in a case in which a loss in the number of incident photons according to a color filter is 66%, and the luminance value is 34% of the original luminance value, the luminance value is corrected to a value having no loss of 66%.

In addition, the luminance value of a color pixel may be corrected by performing an interpolation process using luminance values of surrounding clear pixels.

In Step S110, the arithmetic operation unit 8 combines a color layer with a monochrome image signal and generates a color image for which coloring processing has been performed.

Figure 9:
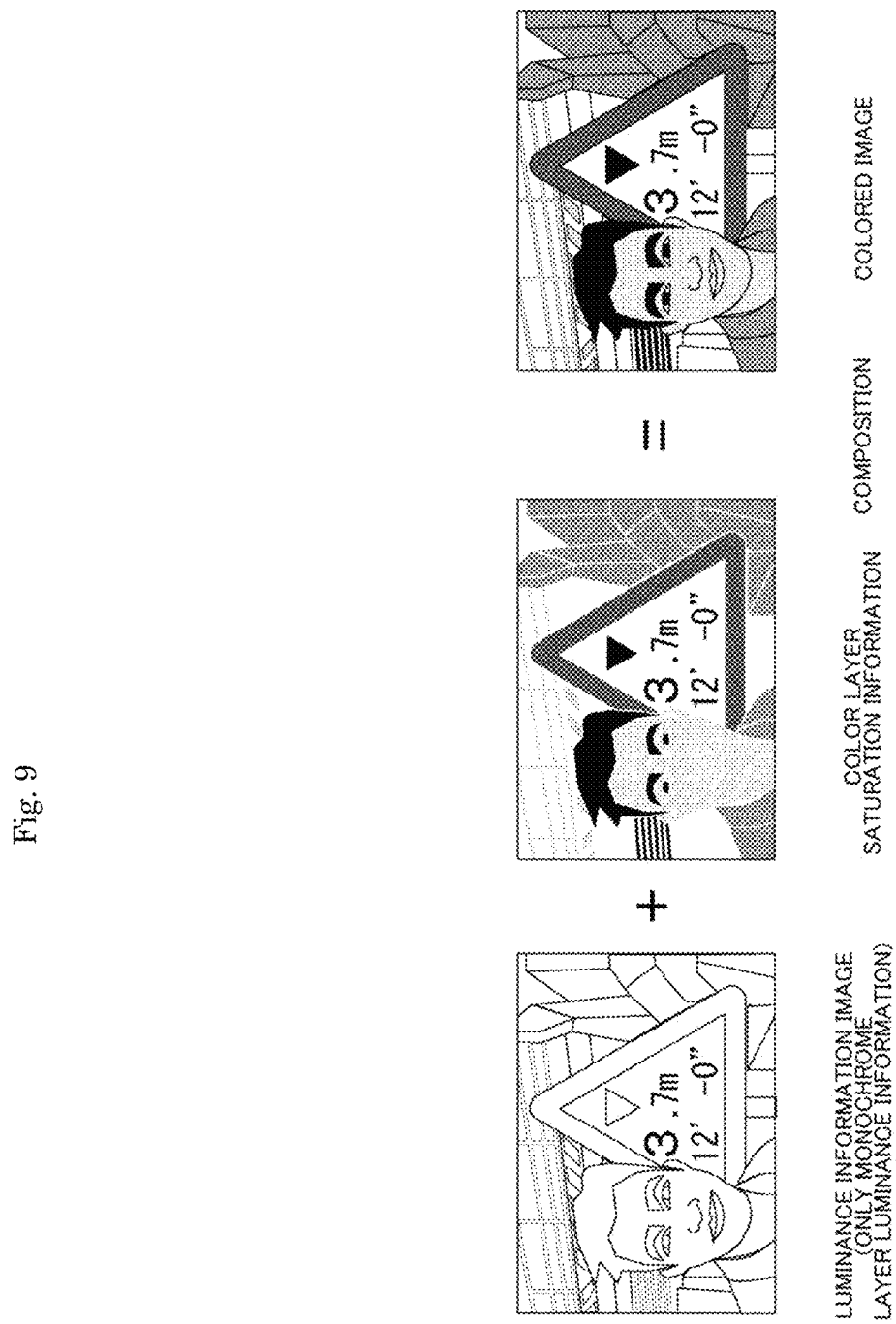
FIG. 9 is a diagram explaining combining of color layers according to an embodiment.

FIG. 9 illustrates a combined image. A luminance information image output from the array sensor 2 is set as a monochrome layer, and this monochrome layer is combined with the color layer, whereby colored image is acquired.

In Step S111, the arithmetic operation unit 8 outputs an image signal as the generated color image. For example, the arithmetic operation unit 8 transmits a color image signal to the buffer 4.

This color image signal is processed by the logic unit 5 and is transmitted to the processor 11 through the memory 6 and the interface unit 7.

Such a color image signal is not acquired by coloring the luminance information image on the basis of only machine learning but is acquired by performing coloring processing by checking an actual color acquired at the color information acquisition point 90 and selecting a color reflecting the actual color, and thus color reproducibility is extremely superior.

4. Disposition and Configuration of Color Information Acquisition Points

Hereinafter, an example of disposition and variations in the configuration of the color information acquisition points 90 will be described.

As an example of disposition of the color information acquisition points 90, although FIG. 5 illustrates an example in which the color information acquisition points 90 are disposed at constant intervals within the pixel array face 2A, it is preferable that the disposition of the color information acquisition points 90 be set in accordance with an application, that is, a use of the sensor device, a use purpose, a required color image definition, and the like.

In addition, the configuration of the color information acquisition point 90 of one unit is various.

Figure 10:
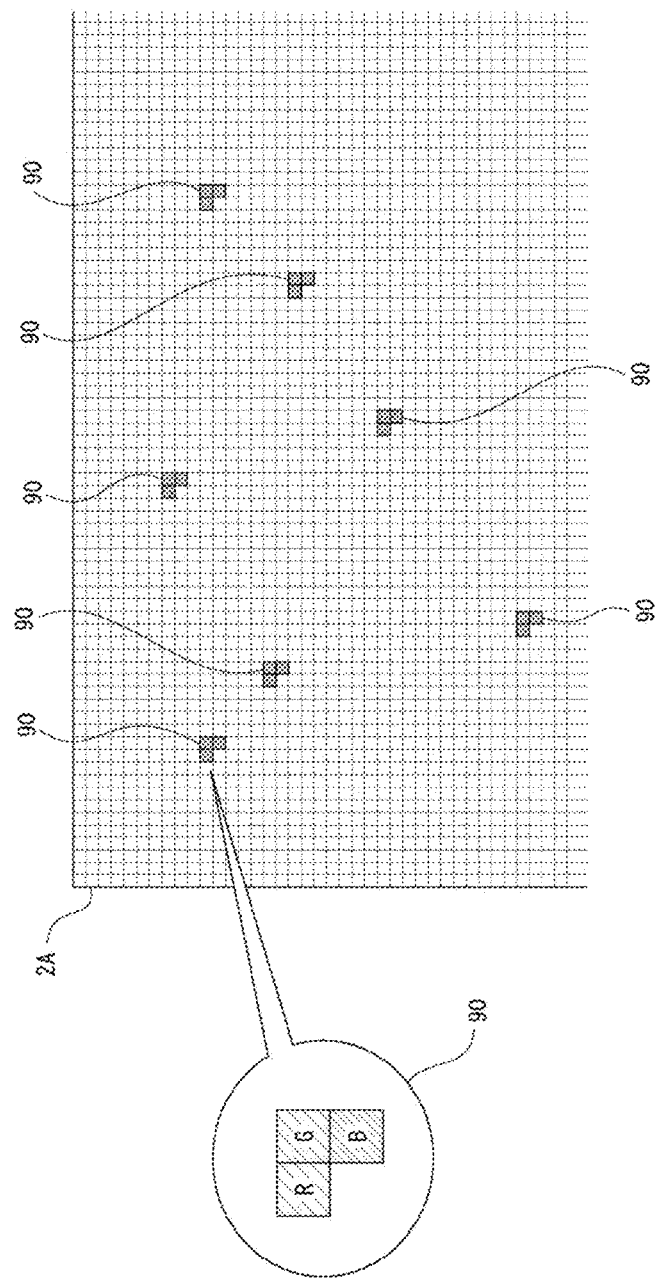
FIG. 10 is a diagram explaining color information acquisition points according to an embodiment.

FIG. 10 illustrates an example in which the color information acquisition points 90 are disposed at non-constant intervals.

In addition, in this example, the color information acquisition point 90 of one unit is configured using three pixels of the R pixel, the G pixel, and the B pixel adjacent to each other as illustrated in FIG. 6B.

Anyway, it is preferable that the disposition and the configuration of the color information acquisition points 90 be such that pixels forming the color information acquisition points 90 are included, a total area of the clear area exceeds 25% of a total area of all the effective pixels of the array sensor 2, and a disposition according to an application is formed.

In addition, it is preferable that the disposition and the configuration of the color information acquisition points 90 be such that the color information acquisition points 90 are discretely disposed on the pixel array face 2A of the array sensor 2.

Various examples will be described.

Figure 11:
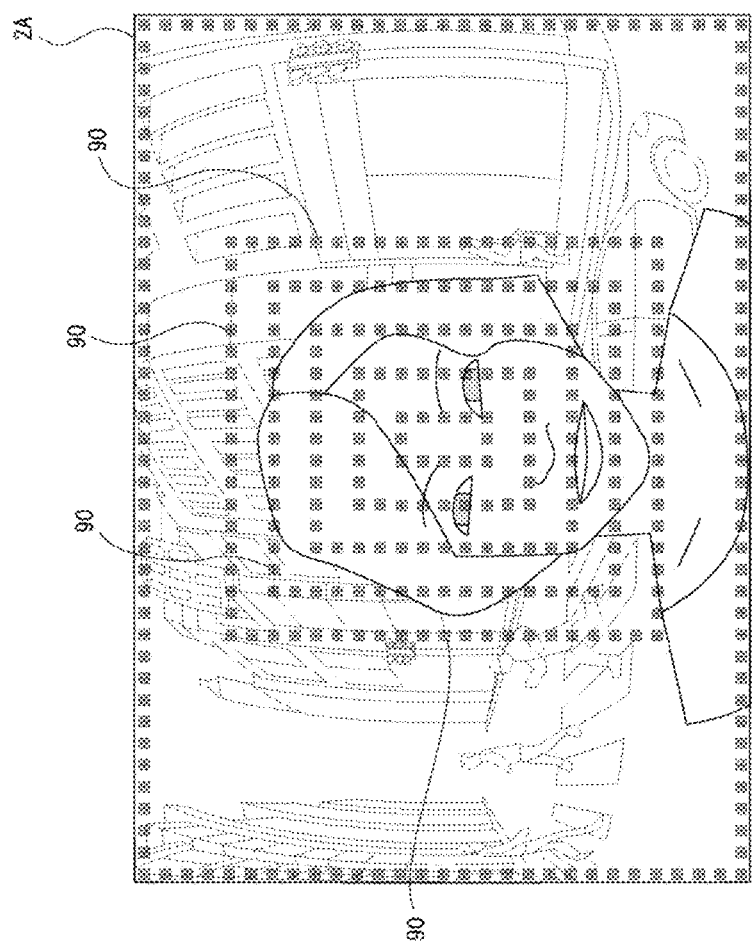
FIG. 11 is a diagram explaining an example of non-constant interval disposition of color information acquisition points according to an embodiment.

FIG. 11 illustrates an example in which the sensor device 1 is assumed to be used in a door camera attached to a main entrance of a house.

The drawing schematically illustrates positions of color pixels configuring the color information acquisition points 90 on the pixel array face 2A. Here, for example, as in FIG. 6A, the color information acquisition point 90 of one unit is formed using four pixels.

In addition, the drawing is a schematic view for description, and thus the color information acquisition point 90 according to four pixels is enlarged. An actual area of the color information acquisition point 90 of one unit is assumed to be much smaller than the illustrated area.

In the case of a door camera, an image of a face is important. It is required that faces of visitors and the like can be accurately acquired including colors for a person present indoors. In addition, when a camera of a security gate or the like used for face authentication is considered, for recognition/collation of faces, similarly, an image of a facial part is important.

Thus, in the case of such a use, as illustrated in the drawing, the color information acquisition points 90 are considered to be intensively disposed in a center portion in which a face is shown.

Figure 12:
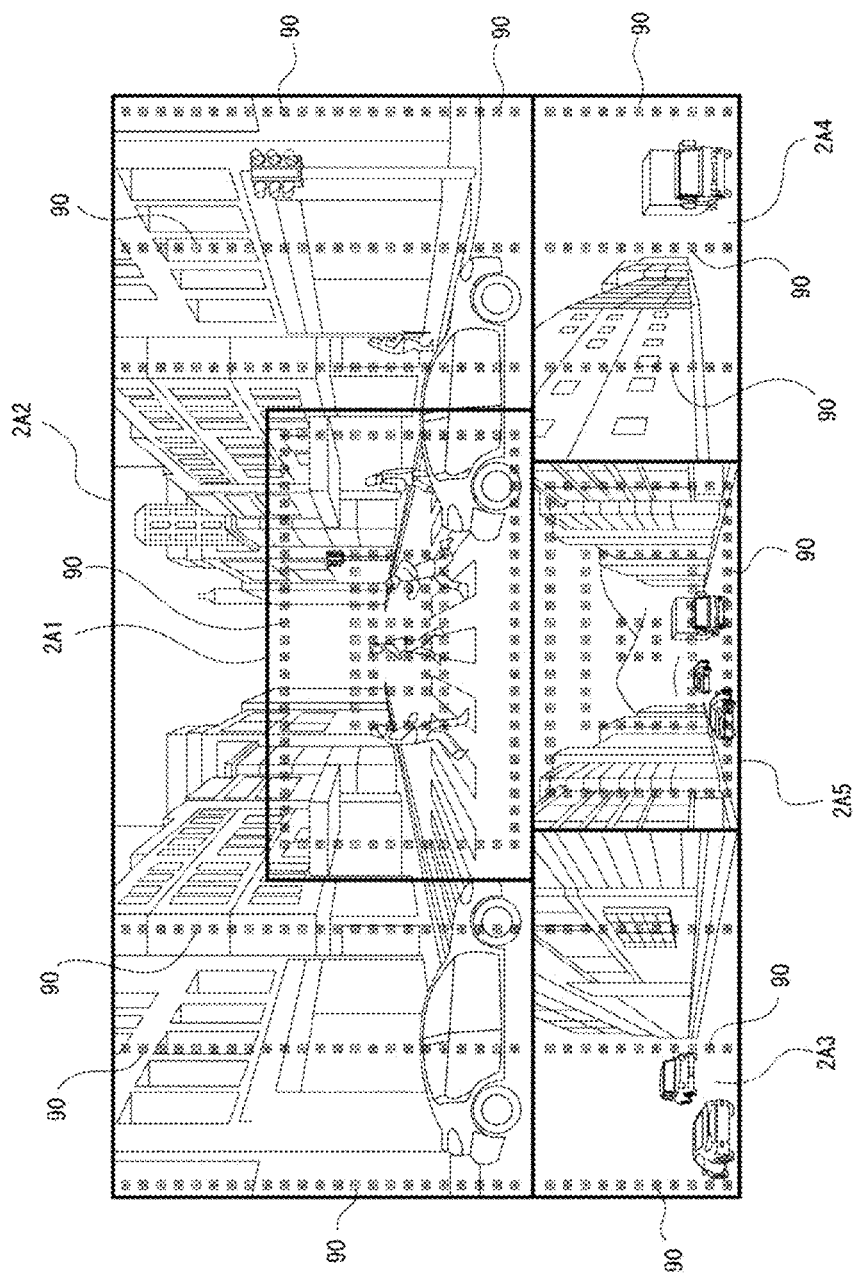
FIG. 12 is a diagram explaining an example of non-constant interval disposition of color information acquisition points according to an embodiment.

FIG. 12 assumes in-vehicle cameras. As the in-vehicle cameras, five cameras are assumed to be mounted. In the drawing, a pixel array face 2A1 of a sensor device 1 of a camera imaging the center on a front side, a pixel array face 2A2 of a sensor device 1 of a camera imaging the front side with a wide field of view, a pixel array face 2A3 of a sensor device 1 of a camera imaging a left side, a pixel array face 2A4 of a sensor device 1 of a camera imaging a right side, and a pixel array face 2A5 of a sensor device 1 of a rear camera.

On the pixel array face 2A1 of the sensor device 1 of the camera imaging the center on the front side, the color information acquisition points 90 are intensively disposed at the center, and a color reproduction function of an object in a running direction is reinforced.

On the pixel array face 2A2 of the sensor device 1 of the camera imaging the front side with a wide field of view, the color information acquisition points 90 are disposed in the shape of several lines in a vertical direction, and a color reproduction function is reinforced for objects approaching in a horizontal direction.

On the pixel array faces 2A3 and 2A4 of the left and right sides, the color information acquisition points 90 are disposed in the shape of several lines in the vertical direction, and a color reproduction function is reinforced for objects running on the left side or the right side and objects passing through the left side and the right side.

On the pixel array face 2A5 of the sensor device 1 of the rear camera, the color information acquisition points 90 are entirely disposed, and the entire color reproduction function is widely maintained.

As in the example illustrated in FIGS. 11 and 12 above, by setting the positions and the density of disposition in accordance with an application, color reproducibility that is appropriate for the purpose can be realized.

In this way, there are an example in which the color information acquisition points 90 are disposed at constant intervals and an example in which the color information acquisition points 90 are disposed at non-constant intervals, and various dispositions may be considered in accordance with applications.

Figure 13:
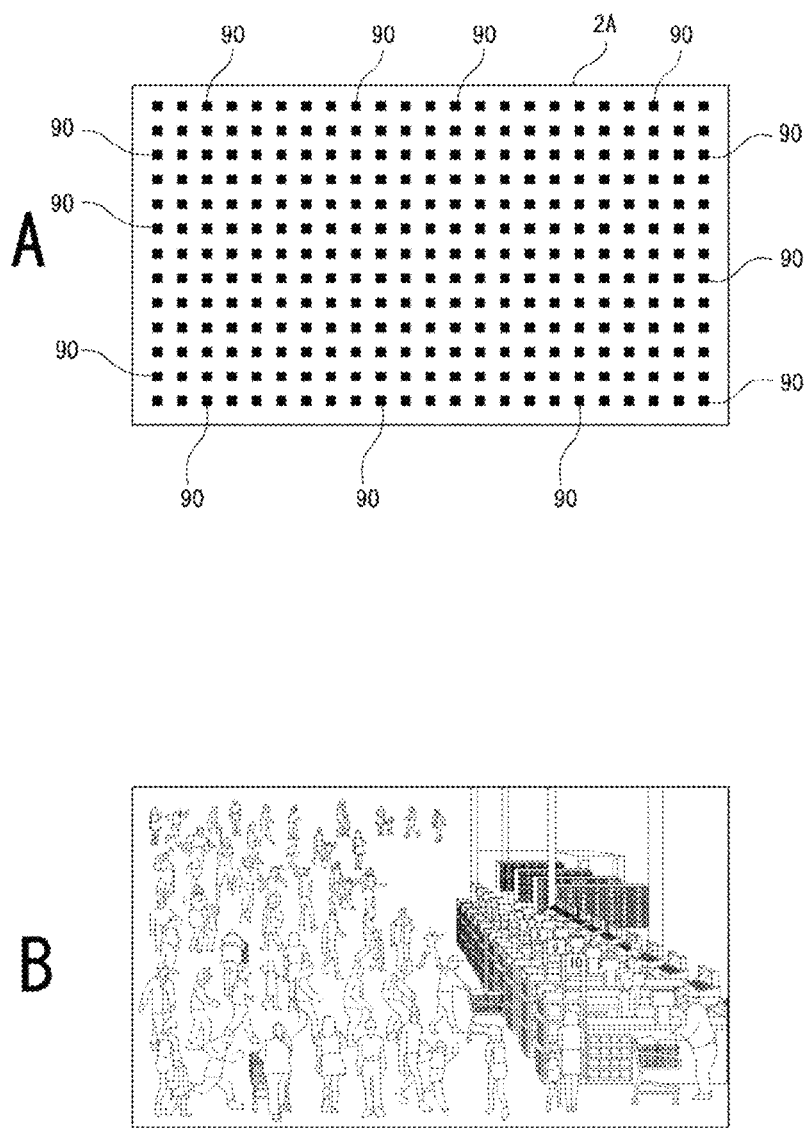
FIG. 13 is a diagram explaining an example of constant interval disposition of color information acquisition points according to an embodiment.
Figure 14:
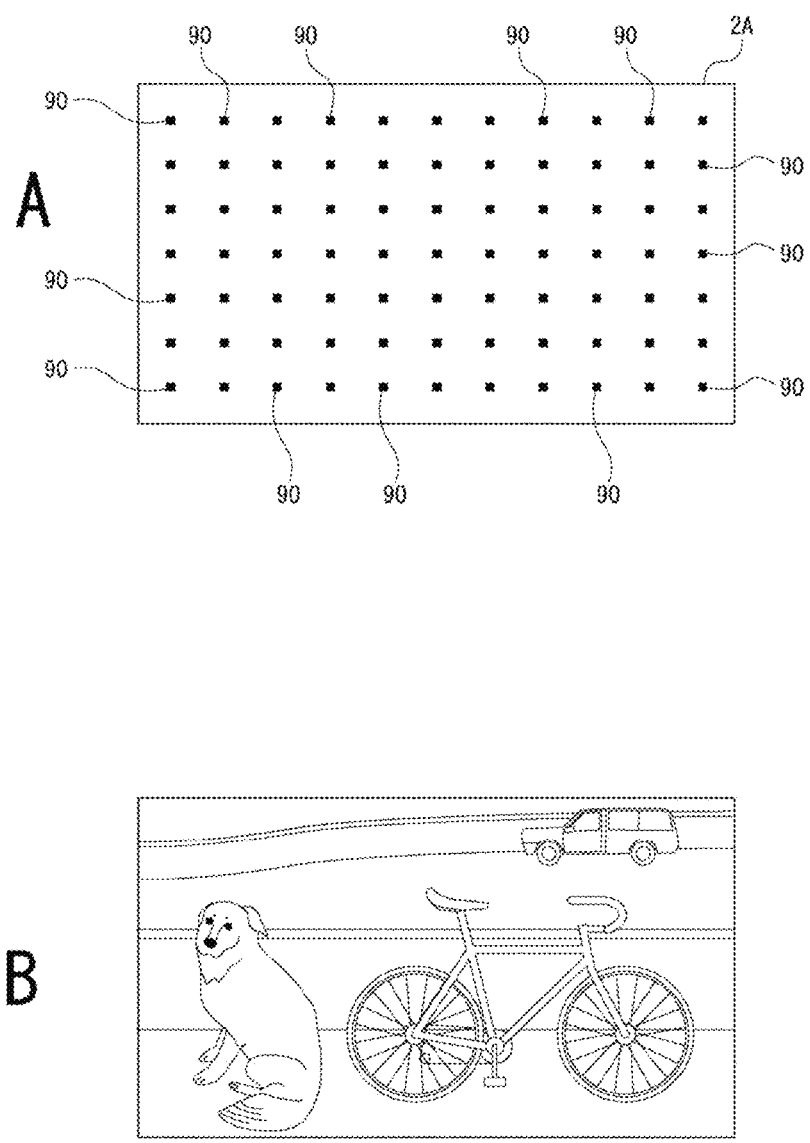
FIG. 14 is a diagram explaining an example of constant interval disposition of color information acquisition points according to an embodiment.
Figure 15:
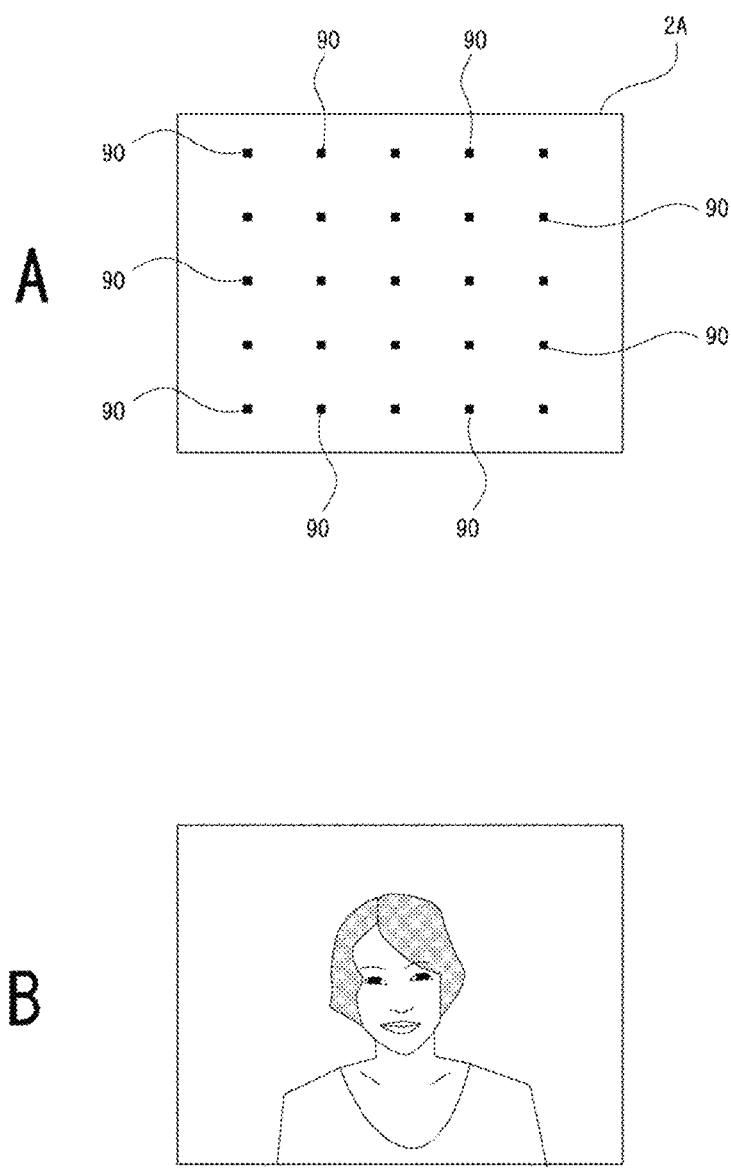
FIG. 15 is a diagram explaining an example of constant interval disposition of color information acquisition points according to an embodiment.

For example, in a case in which the color information acquisition points 90 are disposed at constant intervals, the disposition interval may be variously considered in accordance with the application. FIGS. 13, 14, and 15 illustrate examples in which the densities of the color information acquisition points 90 are different in accordance with difference intervals.

FIG. 13A illustrates an example in which the color information acquisition points 90 are disposed with a high density by assuming a case of a camera employing a large-size image sensor such as so-called 4K, 8K, or the like or a sensor device 1 used in a camera photographing a distant view, a monitoring camera, or the like. For example, although FIG. 13B illustrates an image of a monitoring camera, in such a case, a target person is shown to be small, and the colors are various, and thus, it is preferable to dispose the color information acquisition points 90 with a high density.

FIG. 14A illustrates an example in which color information acquisition points 90 are disposed with a density of an intermediate degree by assuming a sensor device 1 used in a general consumer use.

Although FIG. 14B illustrates an image of a general landscape, the density does not need to be equal to that of the monitoring camera or the like described above. Thus, the color information acquisition points 90 are disposed with a density for which color reproducibility of a certain degree can be secured.

FIG. 15A illustrates an example in which color information acquisition points 90 are disposed with a low density by assuming a sensor device 1 uses in a web camera or the like.

FIG. 15B illustrates an image captured using a web camera. In the case of a use not requiring high color reproducibility using a web camera, the color information acquisition points 90 may be considered to be disposed with a low density for which color reproducibility of a minimum necessity can be secured.

Figure 16:
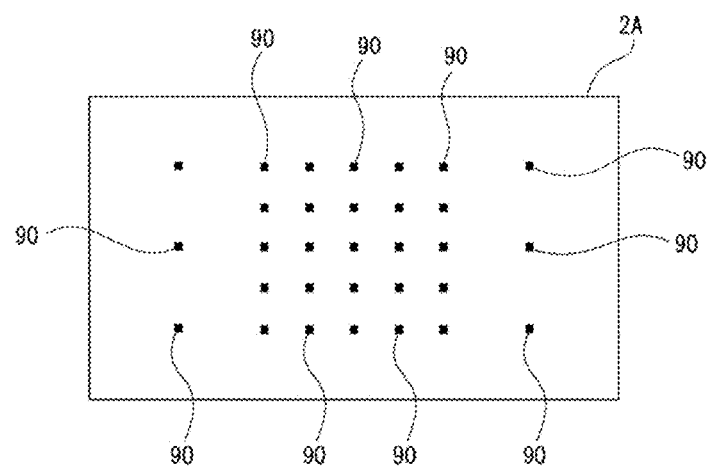
FIG. 16 is a diagram explaining an example of non-constant interval disposition of color information acquisition points according to an embodiment.
Figure 17:
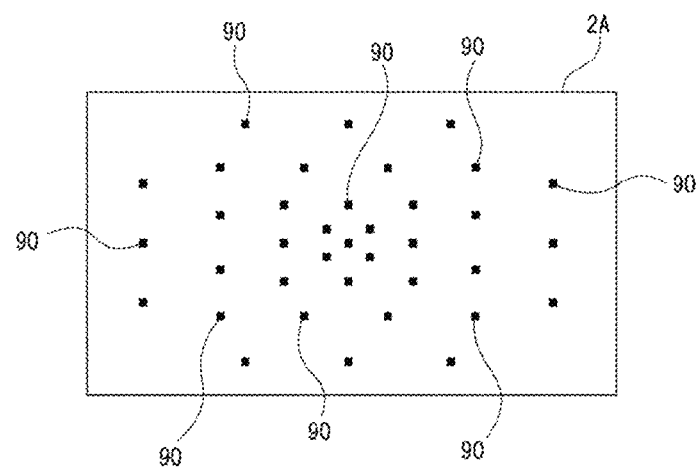
FIG. 17 is a diagram explaining an example of non-constant interval disposition of color information acquisition points according to an embodiment.
Figure 18:
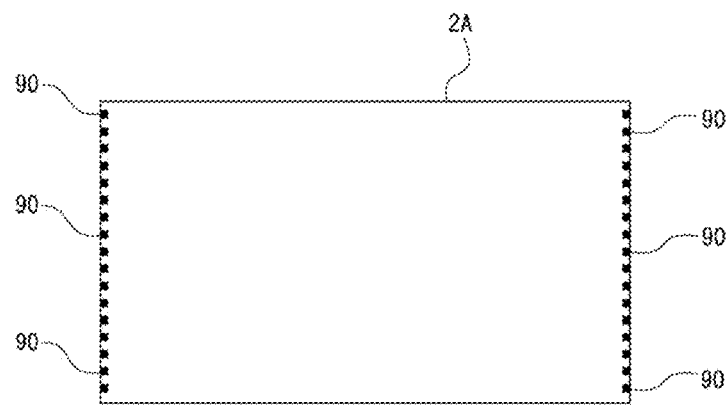
FIG. 18 is a diagram explaining an example of non-constant interval disposition of color information acquisition points according to an embodiment.

In addition, in a case in which color information acquisition points 90 are disposed at non-constant intervals, various examples of the disposition may be variously considered as in FIGS. 16, 17, and 18.

FIG. 16 illustrates an example of disposition of a centralized type and is appropriate for the door camera described above or the like.

FIG. 17 illustrates an example of disposition of a spread type and, for example, can be applied to a camera for the front side as an in-vehicle camera.

FIG. 18 illustrates an example of disposition of a line type and, for example, can be applied to a camera in a horizontal direction as an in-vehicle camera.

Next, various examples of the configuration of the color information acquisition point 90 will be described.

First, an example in which the color information acquisition point 90 of one unit is formed using a plurality of pixels is illustrated.

FIG. 19A illustrates an example in which the color information acquisition point 90 of one unit is formed using four pixels (the R pixel, the G pixel, the B pixel, and the G pixel) of the Bayer array.

FIG. 19B is an example in which the color information acquisition point 90 of one unit is formed using 16 pixels adjacent to each other. In this case, the color information acquisition point 90 is formed using four R pixels, four G pixels, four B pixels, and four G pixels.

FIG. 19C is an example in which the color information acquisition point 90 of one unit is formed using three pixels (an R pixel, a G pixel and a B pixel) adjacent to each other.

FIG. 19D is an example in which the color information acquisition point 90 of one unit is formed using 12 pixels adjacent to each other. In this case, the color information acquisition point 90 is formed using three R pixels, three G pixels, three B pixels, and three G pixels, Clear pixels to which diagonal lines are not assigned may be regarded not to be included in the color information acquisition point 90.

FIG. 19E is an example in which the color information acquisition point 90 of one unit is formed using three pixels (an R pixel, a G pixel, and a B pixel) aligned to be adjacent in a vertical direction.

FIG. 19F is an example in which the color information acquisition point 90 of one unit is formed using three pixels (an R pixel, a G pixel, and a B pixel) aligned to be adjacent in a horizontal direction.

FIG. 19G is an example in which the color information acquisition point 90 of one unit is formed using 9 pixels (an R pixel, a G pixel, a B pixel, an R pixel, a G pixel, a B pixel, an R pixel, a G pixel, and a B pixel) aligned to be adjacent in a horizontal direction.

FIGS. 20B, 20C, and 20D illustrate examples in which the area of a color information acquisition point 90 of one unit is enlarged, for example, on the basis of four pixels (an R pixel, a G pixel, a B pixel, and a G pixel) of the Bayer array illustrated in FIG. 20A.

FIG. 20B is an example in which a color information acquisition point 90 of one unit is formed by configuring four groups of four pixels of the Bayer array to be adjacent to each other in horizontal and vertical directions.

FIG. 20C is an example in which a color information acquisition point 90 of one unit is formed by configuring 9 groups of four pixels of the Bayer array to be adjacent to each other in horizontal and vertical directions.

FIG. 20D is an example in which a color information acquisition point 90 of one unit is formed by configuring 16 groups of four pixels of the Bayer array to be adjacent to each other in horizontal and vertical directions.

In addition, the color information acquisition point 90 of one unit may not necessarily include all the R pixel, the G pixel and the B pixel.

FIG. 21A is an example in which the color information acquisition point 90 of one unit is formed by two G pixels adjacent to each other in a diagonal direction.

FIG. 21B is an example in which the color information acquisition point 90 of one unit is formed by 8 G pixels adjacent to each other in a diagonal direction.

In addition, certainly, an example in which B pixels or R pixels are used in the examples illustrated in FIGS. 21A and 21B may be considered.

FIG. 21C is an example in which a pixel of another color is included in addition to an R pixel, a G pixel, and a B pixel.

In addition, the pixel of another color is a pixel in which a color filter transmitting light of another color is disposed in an incident optical path. Here, a yellow (Y) pixel is illustrated as an example.

As illustrated in the drawing, the color information acquisition point 90 of one unit is formed by four pixels of the R pixel, the G pixel, the B pixel, and the Y pixel.

FIG. 21D is an example in which the color information acquisition point 90 of one unit is formed by 16 color pixels by configuring four-pixel groups having the structure illustrated in FIG. 21C to be adjacent to each other.

Here, although the Y pixel is illustrated as an example, a pixel of another color such as a magenta pixel, a cyan pixel, or the like may be used as the pixel of another color.

In addition, pixels of two or more kinds of colors such as a Y pixel and a magenta pixel may be used as pixels of other colors.

Furthermore, not all the R pixel, the G pixel, and the B pixel may be included. For example, an example in which the color information acquisition point 90 of one unit is configured by an R pixel, a G pixel, and a Y pixel, an example in which the color information acquisition point 90 of one unit is configured by a B pixel and a Y pixel, and the like may be considered to be used.

A combination of colors of color pixels used for the color information acquisition point 90 may be determined in accordance with a use, a purpose, and the like of the sensor device 1. For example, in a case in which a color of which reproducibility is desired to be secured is a specific color, the structure of the color information acquisition point 90 may be determined in accordance with the color.

Up to here, although an example in which the color information acquisition point 90 of one unit is configured by a plurality of pixels has been illustrated, the color information acquisition point 90 of one unit may be configured by one pixel.

FIG. 22A illustrates an example in which the color information acquisition point 90 is configured by one R pixel.

In this case, on the pixel array face 2A, color information acquisition points 90 according to one pixel are discretely disposed as in FIG. 22B.

It is apparent that the color information acquisition point 90 may be configured by a G pixel or may be configured by a B pixel.

In addition, as the color information acquisition points 90 according to one pixel, as illustrated in FIG. 22C, pixels of respective colors may be disposed. In other words, a color information acquisition point 90 according to an R pixel, a color information acquisition point 90 according to a G pixel, and a color information acquisition point 90 according to a B pixel are discretely disposed.

As in each of the examples described above, there are various examples of the disposition of the color information acquisition points 90 and various examples of the configuration of the color information acquisition point 90, and other various examples other than the illustrated examples are conceivable.

5. Another Example of Configuration of Sensor Device

An example of the configuration of the sensor device 1 is not limited to that illustrated in FIG. 1, and another example may be considered.

Figure 23:
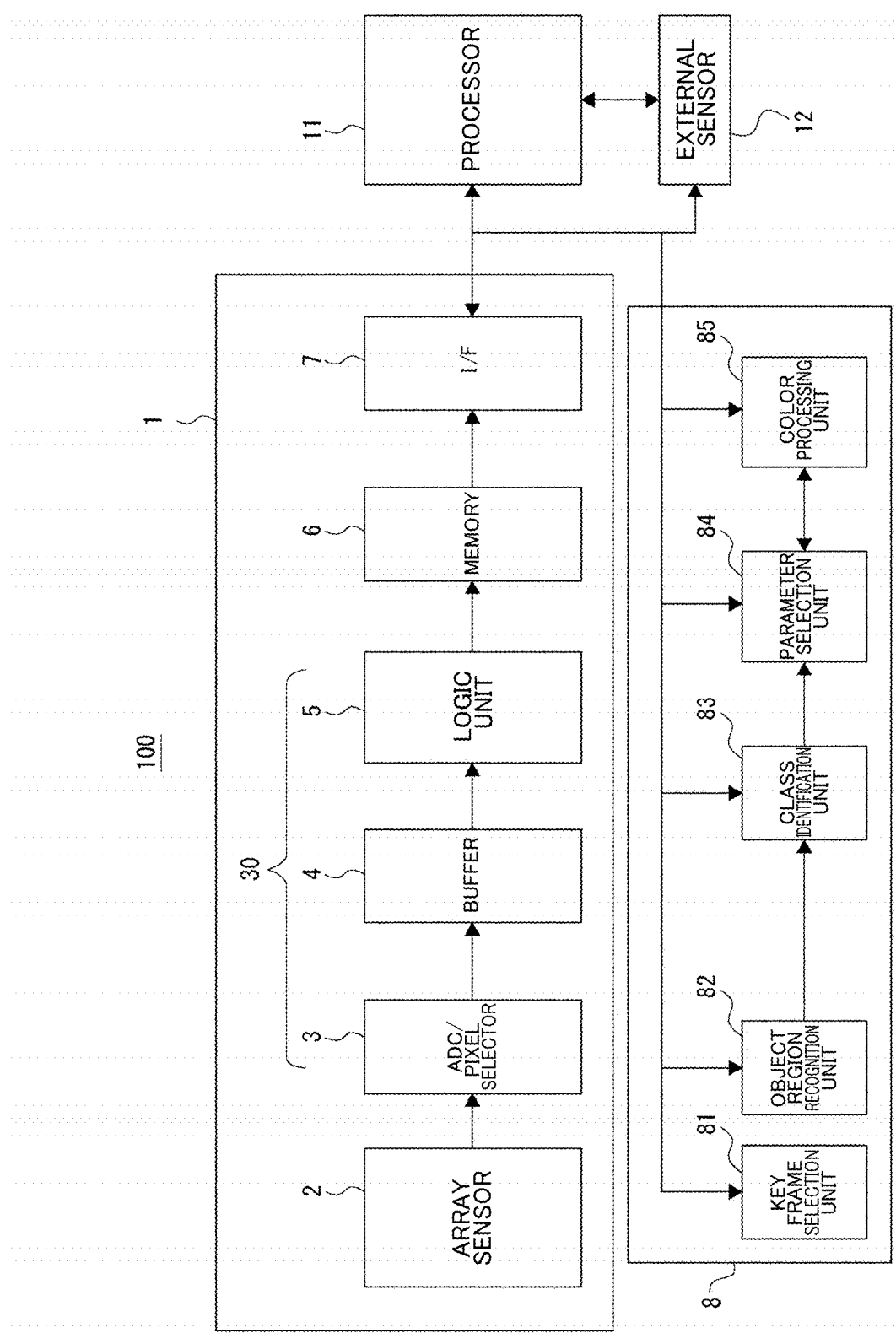
FIG. 23 is a block diagram of an example of another configuration that can be applied to an embodiment.

FIG. 23 is an example of the configuration in which an arithmetic operation unit 8 is disposed separately from the sensor device 1 as the terminal device 100. In addition, as the terminal device 100, various types such as an information processing terminal, an imaging apparatus terminal, and the like may be considered to be used.

The arithmetic operation unit 8 is regarded as a chip separated from the sensor device 1 and is regarded to be disposed inside the terminal device 100 and be able to communicate with the sensor device 1 through the interface unit 7.

Then, by including a DNN engine as the color processing unit 85, the arithmetic operation unit 8 can perform processing similar to that of the case illustrated in FIG. 1 described above.

Figure 24:
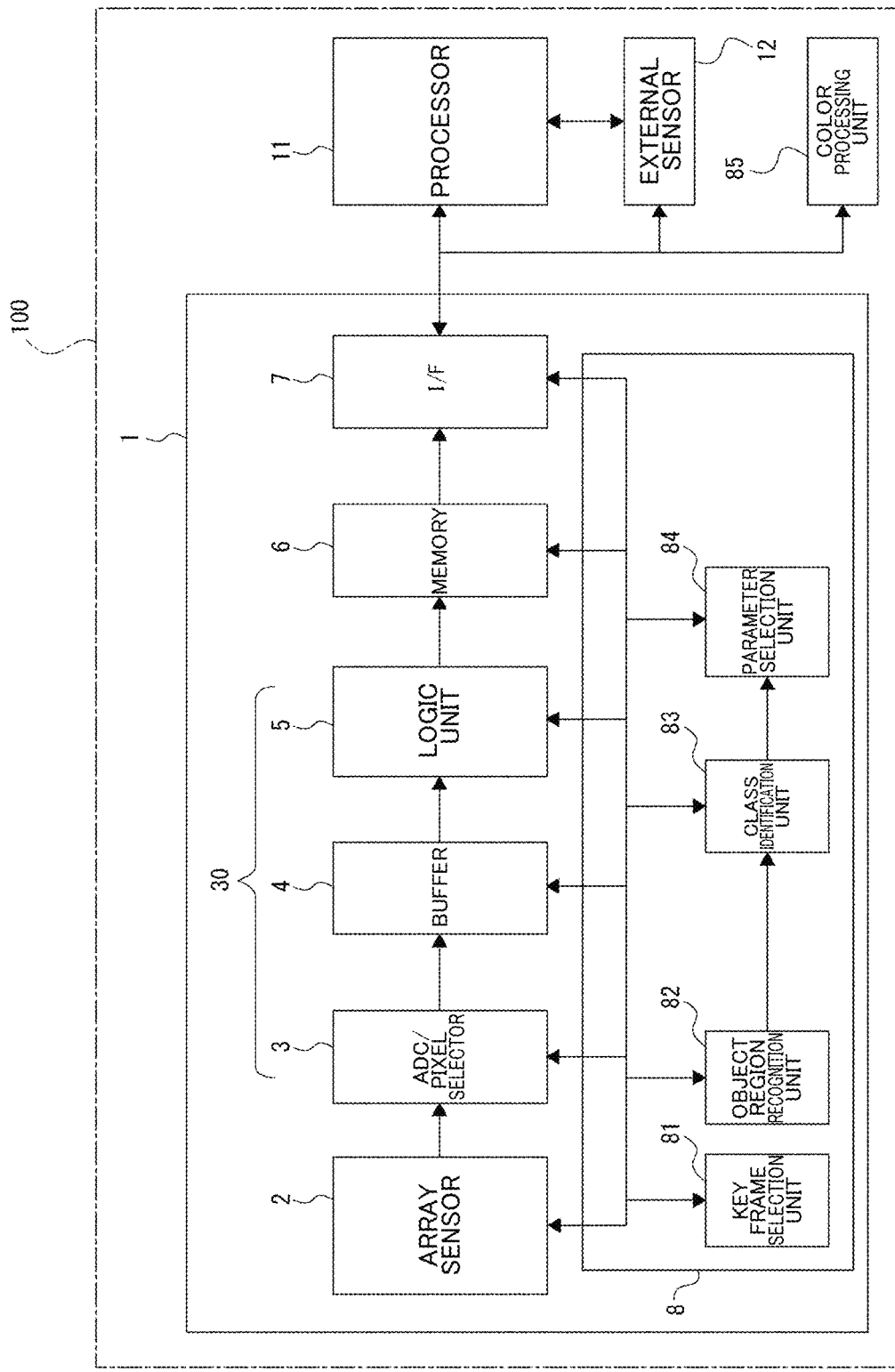
FIG. 24 is a block diagram of an example of yet another configuration that can be applied to an embodiment.

An example of the configuration illustrated in FIG. 24 is an example of a case in which the DNN engine as the color processing unit 85 is formed using a processor or the like that is independent from the sensor device 1 and the arithmetic operation unit 8.

For example, a configuration in which the sensor device 1 (including the arithmetic operation unit 8), the processor 11, the external sensor 12, and the color processing unit 85 are included as the terminal device 100 is formed. Also in this case, the color processing unit 85 is regarded to be able to communicate with the sensor device 1 through the interface unit 7 and can perform processing that is similar to that of a case of the configuration illustrated in FIG. 1 described above in linkage with the arithmetic operation unit 8.

Furthermore, although not illustrated, in the configuration in which the sensor device 1 and the arithmetic operation unit 8 are configured as separate bodies as in FIG. 23, the color processing unit 85 may be further configured by a processor or the like that is a separate body.

In addition, similar to the color processing unit 85, the key frame selection unit 81, the object region recognition unit 82, the class identification unit 83, the parameter selection unit 84, and the like may be considered to be configured to be disposed outside the sensor device 1 or outside the arithmetic operation unit 8 as well. This point can be applied also to the modified example of the configuration illustrated in FIG. 1.

6. Conclusion and Modified Example

According to the above-described embodiment, the following effects are obtained. The sensor device 1 according to the embodiment includes: an array sensor 2 in which a plurality of imaging elements are arranged one-dimensionally or two-dimensionally, some of the imaging elements are configured as color-filter-disposed pixels in which a color filter is disposed in an incident optical path, and color information acquisition points 90 are formed by the color-filter-disposed pixels; and an arithmetic operation unit 8.

Then, the arithmetic operation unit 8 performs an image processing method including: performing object detection for an image acquired by imaging using the array sensor 2 including the color information acquisition points 90 and performing coloring processing in a pixel range of a detected object by referring to color information acquired at the color information acquisition points 90 corresponding to the inside of the pixel range of the detected object.

In this case, as the array sensor 2, pixels other than the pixels configured as the color information acquisition points 90 are clear pixels in which no color filter is disposed, and thus the loss in incident photons is reduced, the number of incident photons can be increased, and significant improvement of sensitivity can be realized as the entire image sensor.

In addition, generally, in the case of a color image sensor, the resolution is lower than that of a monochrome image sensor (for example, lowered to be ¼ in the case of the Bayer array), and each pixel of the array sensor 2 is used for luminance detection as a monochrome pixel, coloring is performed in the processing of the arithmetic operation unit 8, and thus lowering of the resolution due to a color pixel does not occur. In other words, as an image sensor outputting a color image, high resolution and high definition can be realized.

In addition, generally, in the case of a color image sensor, although there are cases in which a false color and a color moire occur, and a low-pass filter processing is performed in order to handle such the occurrence thereof, in the case of this embodiment, such problems dos not occur, and lowering of the resolution due to low-pass filter processing does not occur.

In addition, the coloring processing is performed by performing object detection and using color information of the color information acquisition points 90 corresponding to the pixel range of the object. In this case, actual color information is referred to, and thus coloring processing having high reproducibility can be performed for the detected object inside the image.

In the embodiment, by performing color estimating processing based on learning data for an object detected inside an image acquired by the array sensor 2, the arithmetic operation unit 8 can perform coloring based on machine learning. Here, a plurality of candidates are generated in the estimation of a color using machine learning. In addition, for details of learning data, an object of a design as illustrated as an example in FIG. 4 of which a color cannot be easily identified, or the like, there is a limit on the reproducibility. Thus, by referring to actual color information according to the color information acquisition points 90, a candidate color that is close to an actual color among candidate colors acquired through machine learning is selected. In this way, in addition to coloring having high reproducibility based on machine learning, coloring processing covering the limit of coloring through the machine learning can be performed, and as a result, a color image having extremely high reproducibility can be generated.

In other words, in this embodiment, a color image having high sensitivity, high resolution, and high reproducibility can be generated.

In the embodiment, a color layer is generated on the basis of a candidate color selected on the basis of color information acquired from the color information acquisition points 90, and the color layer is combined with a luminance information image acquired from the array sensor, whereby a color image is generated (see FIGS. 8 and 9).

In this way, coloring using machine learning and the information of the color information acquisition points 90 can be reflected in luminance information acquired by the array sensor 2, that is, a monochrome image.

In the embodiment, an example in which luminance correction is performed on a luminance information image acquired from the array sensor 2 has been described (Step S109 illustrated in FIG. 8).

The pixels of the color information acquisition points 90 are through color filters and thus have a larger incident photon loss and lower luminance than those of a clear pixel. Then, in a luminance information image configuring a monochrome layer, the luminance of pixels of the color information acquisition points 90 is lower than that of a general pixel, and non-uniformity of luminance occurs as a whole of the image. Thus, the luminance values of pixels of the color information acquisition points 90 are corrected to be increased by a level corresponding to a loss due to color filters. In accordance with this, the image quality of the monochrome layer is improved, and furthermore, the quality of the color image after coloring is improved as well.

In this case, luminance correction of pixels of the color information acquisition points 90 can be realized more accurately by performing interpolation from luminance information of surrounding pixels.

In the embodiment, in the array sensor 2, a total area of pixels not forming the color information acquisition points 90 is configured to exceed 25% of a total area of all the effective pixels on the array sensor described above.

In other words, when a total area of a clear area according to clear pixels is compared with a total area of a color area according to color pixels, (total area of clear area)/(total area of clear area+total area of color area) is configured to exceed 0.25.

In addition, when all the pixels have the same area, (the number of clear pixels)/(the number of clear pixels+the number of color pixels) is configured to exceed 0.25.

The clear area is provided for implementation of high sensitivity and high definition, and, by configuring the ratio between the area of the clear area and the area of the color area as such, the effects of implementation of high sensitivity and high definition described above can be exhibited satisfactorily.

In addition, in a case in which implementation of high sensitivity and high definition is important, it is preferable that the area of the clear area exceed 50% of the total area of all the effective pixels or exceed 75% of the total area. For example, in a case in which the area of the clear area is configured to exceed 75% of the total area, clear pixels are dominant, and there is a small number of color pixels that configure the color information acquisition points 90. In this way, when a pixel disposition in which clear pixels are dominant is realized, it is very effective for reduction of an incident photon loss, and the effects of implementation of high sensitivity and high definition described above appear more satisfactorily.

In the embodiment, the color information acquisition points 90 are discretely disposed in the array sensor 2.

In other words, the color information acquisition points 90 of one unit are disposed not consecutively but discretely on a pixel array that is two-dimensionally disposed (see FIGS. 6, 10, and 13 to 18).

By discretely disposing the color information acquisition points 90, the number of the color information acquisition points 90 is suppressed as much as possible, and actual color information of each portion inside an image can be acquired.

Thus, for objects detected at respective places inside the image, coloring processing having high reproducibility can be performed by referring to actual color information.

In addition, also in a case in which pixels are disposed one-dimensionally, the color information acquisition points are assumed to be disposed discretely.

In the embodiment, the color information acquisition points 90 are disposed at constant intervals in the array sensor 2 (see FIGS. 13, 14, and 15).

By disposing the color information acquisition points 90 at constant intervals, actual color information of each portion can be acquired inside the entire image.

In addition, by setting a density of the constant interval in accordance with required image quality, the use purpose of the sensor device 1, and the like, image capture according to required accuracy based on the use purpose and the like, in other words, image capture and generation of a color image according to an application can be performed. For example, in FIGS. 13, 14, and 15, although examples in which the densities of the color information acquisition points 90 are different from each other are illustrated, these are examples of disposition of the color information acquisition points 90 according to the use purpose and required accuracy.

Particularly, from the point of an increase in sensitivity and implementation of high resolution, the less the number of color pixels in which color filters are disposed, the better. On the other hand, when more color information acquisition points 90 are disposed, it is more advantageous for color reproduction. Thus, it is preferable to set the disposition density from the idea of decreasing the disposition of the color information acquisition points 90 as much as possible in accordance with a use purpose and required accuracy and securing a necessary number of the information acquisition points for color reproduction.

In addition, in a case in which the color information acquisition points 90 are disposed at constant intervals, although they may be disposed at the same intervals in the horizontal direction and the vertical direction, the disposition intervals may be differently configured in the horizontal and vertical directions like a case in which the color information acquisition points are disposed at a first constant interval in the horizontal direction and are disposed at a second constant interval in the vertical direction.

In addition, also in a case in which pixels are disposed one-dimensionally, the color information acquisition points 90 are assumed to be disposed at constant intervals in the direction of arrangement.

In the embodiment, in the array sensor 2, the color information acquisition points 90 are disposed at non-constant intervals (see FIGS. 10, 11, 12, 16, 17, and 18). By disposing the color information acquisition points 90 at non-constant intervals, actual color information can be acquired with a degree of significance inside an image according to an imaging purpose taken into account.

In accordance with situations in which the sensor device 1 is used, in other words, in accordance with a difference in the application such as a monitoring camera, an in-vehicle camera, a web camera, or the like, a required degree of significance inside the image is different. Thus, by disposing the color information acquisition points 90 to match a request for a degree of significance, image capture and generation of a color image according to the application can be performed. For example, in FIGS. 10, 11, 12, 16, 17, and 18, although examples of disposition in which the color information acquisition points 90 are disposed at non-constant intervals are illustrated, there are examples of the disposition of the color information acquisition points 90 that is appropriate for use purposes.

As described above, from the point of an increase in sensitivity and implementation of high resolution, the less the number of color pixels in which color filters are disposed, the better. However, when more color information acquisition points 90 are disposed, it is more advantageous for color reproduction. Thus, by disposing the color information acquisition point 90 with a higher density in a significant area in accordance with the use purpose, a more desirable color image can be generated.

In addition, also in a case in which pixels are disposed one-dimensionally, the color information acquisition points 90 are considered to be disposed at non-constant intervals in the direction of arrangement.

Figure 19:
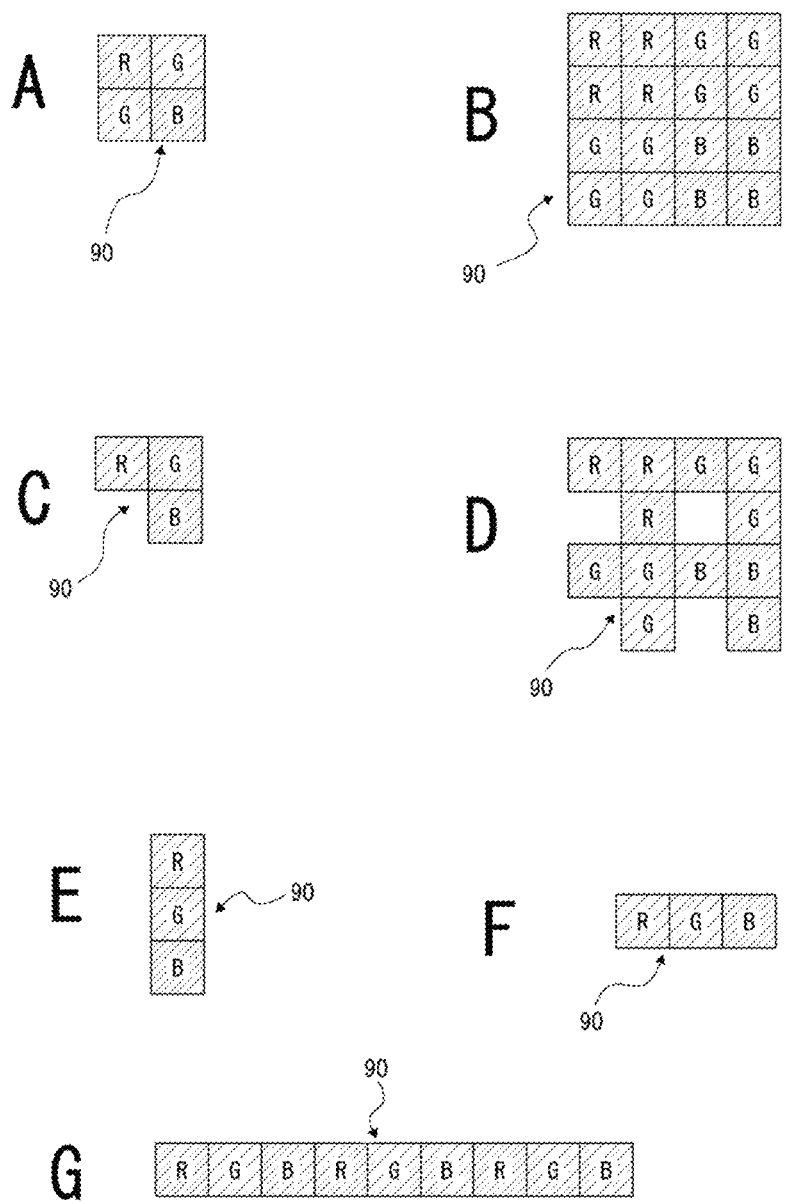
FIG. 19 is a diagram explaining an example of a configuration of color information acquisition points according to an embodiment using a plurality of pixels.
Figure 20:
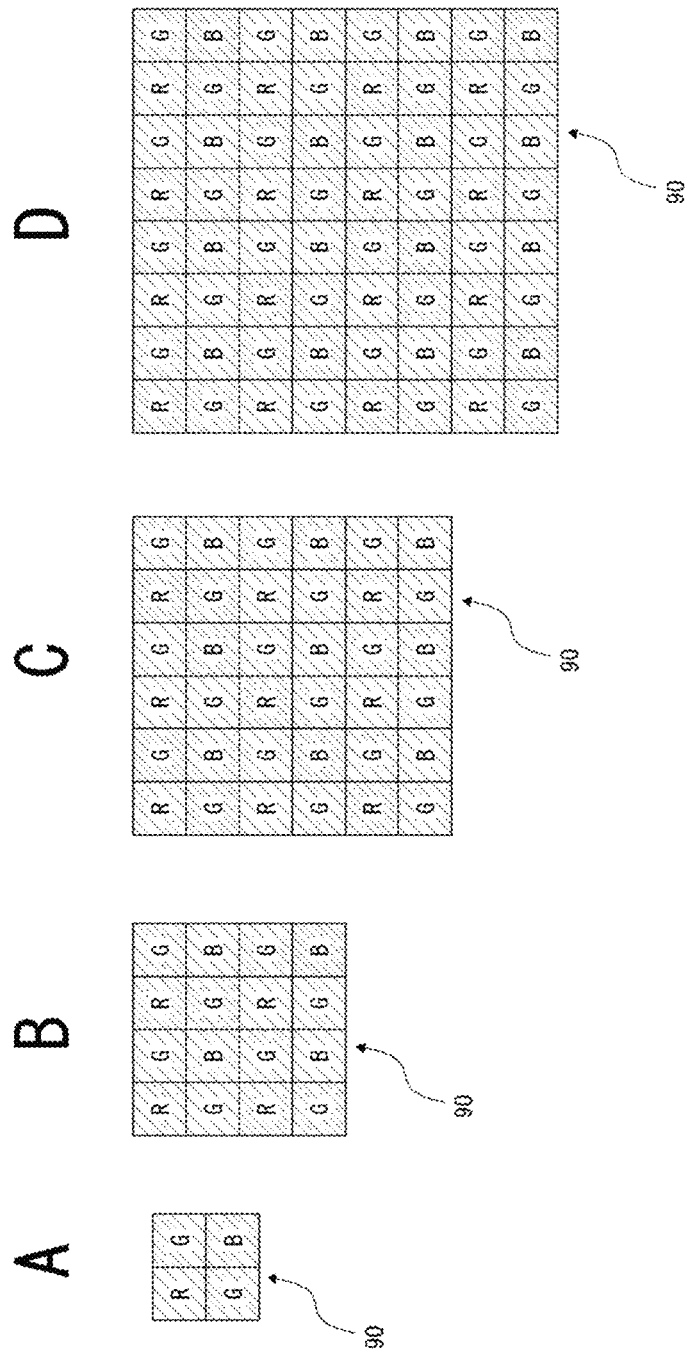
FIG. 20 is a diagram explaining an example of a configuration of color information acquisition points according to an embodiment using a plurality of pixels.
Figure 21:
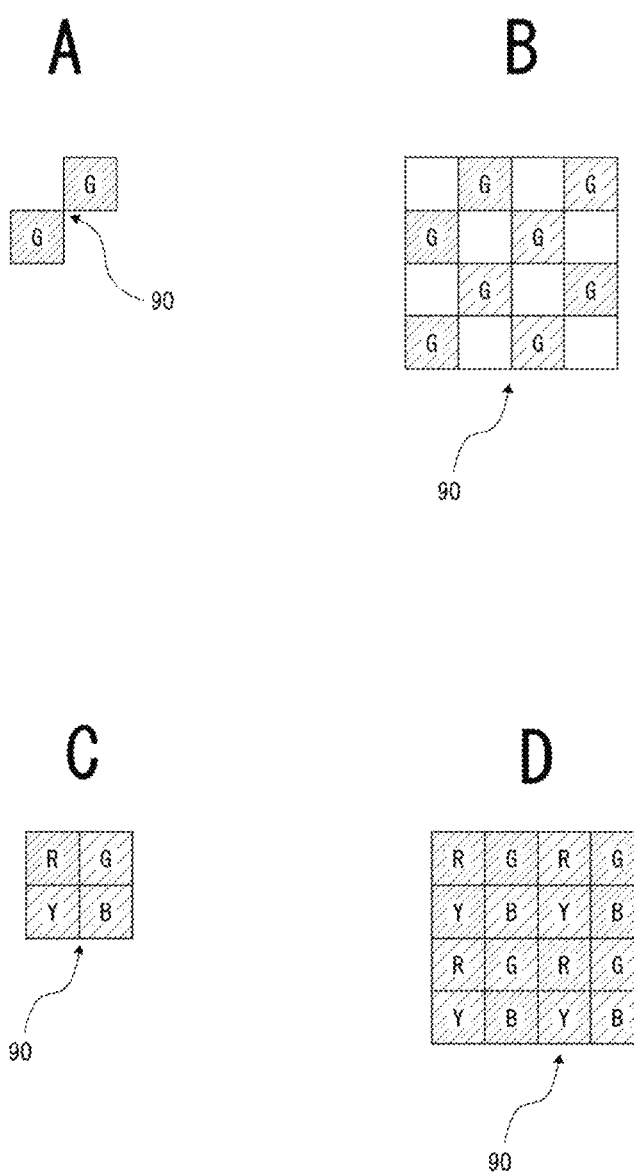
FIG. 21 is a diagram explaining an example of a configuration of color information acquisition points according to an embodiment using a plurality of pixels.

In the embodiment, an example in which one unit of color information acquisition points 90 is configured by a plurality of adjacent pixels in the array sensor 2 has been described (see FIGS. 19, 20, and 21). In such drawings, one unit of the color information acquisition points 90 is configured by two or more pixels that are adjacent in a vertical direction, a horizontal direction, or a diagonal direction in the array sensor 2. By configuring one unit using a plurality of pixels, a likelihood of color information being acquired more accurately can be raised.

In the embodiment, an example in which one unit of the color information acquisition points 90 is configured by a plurality of adjacent pixels and includes an R pixel, a G pixel, and a B pixel in the array sensor 2 has been described (see FIGS. 19 and 20). In such drawings, by including pixels of three primary colors in one unit of the color information acquisition point 90, various kinds of color information can be acquired by the color information acquisition points 90 of one unit. In this way, the likelihood of color information being acquired more accurately can be raised.

In the embodiment, an example in which one unit of the color information acquisition points 90 is configured by a plurality of adjacent pixels and includes an R pixel, a G pixel, a B pixel, and a pixel of another color (for example, a Y pixel) in the array sensor 2 has been described (see FIGS. 21C and 21D). Also in this case, various kinds of color information can be acquired by the color information acquisition points 90 of one unit. Particularly, in a case in which there is a request for detecting an object of a specific color, by disposing pixels of colors appropriate for detection of the object, detection accuracy can be improved. In addition, the pixel of another color is not limited to yellow. For example, various colors such as cyan and magenta are assumed. Furthermore, as another color, pixels of two or more kinds of colors may be disposed.

Figure 22:
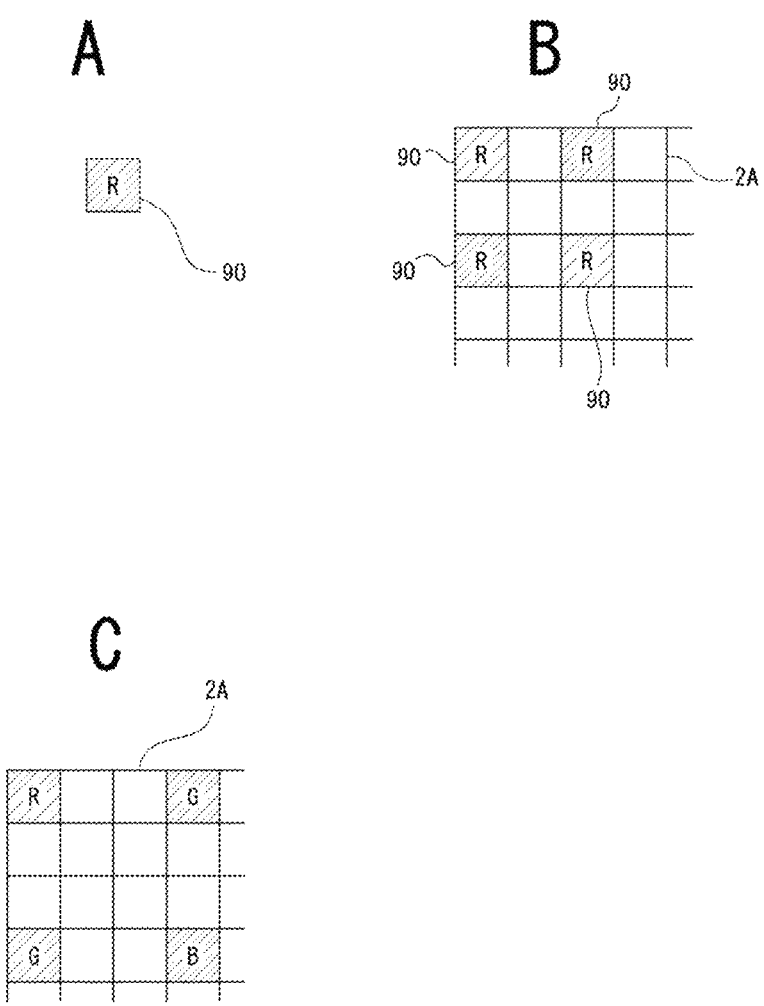
FIG. 22 is a diagram explaining an example of a configuration of color information acquisition points according to an embodiment using a single pixel.

In the embodiment, an example in which one unit of the color information acquisition points 90 is configured by one pixel, and the color information acquisition points 90 are discretely disposed in the array sensor 2 has been described (see FIG. 22).

In this way, by disposing the color information acquisition points 90 for acquiring one piece of certain color information, sufficient color reproduction can be performed depending on the imaging purpose of the sensor device 1.

As in FIG. 22B, when all the color information acquisition points 90 are configured to be pixels of the same color, it is appropriate for the purpose of detection of an object of a specific color.

As in FIG. 22C, by configuring the color information acquisition points 90 to be pixels of different colors, detection of various colors can be performed in each portion inside the image.

Then, like these, by forming the color information acquisition points 90 of one unit using one pixel, pixels of which the number of incident photons is decreased due to a color filter can be disposed more discretely.

The sensor device 1 according to the embodiment has been described to include the array sensor 2 in which a plurality of imaging elements are arranged one-dimensionally or two-dimensionally, some of the imaging elements are configured as color-filter-disposed pixels in which a color filter is disposed in an incident optical path, color information acquisition points 90 are formed by the color-filter-disposed pixels, and a total area of pixels not forming the color information acquisition points 90 exceeds 25% of a total area of all the effective pixels on the array sensor.

By configuring the area of the clear area configuring the color information acquisition points 90 to exceed 25% of the total area, it is effective to reduce an incident photon loss due to clear pixels.

In addition, by disposing the color information acquisition points 90, improvement of reproducibility of the coloring processing in the arithmetic operation unit 8 inside the sensor device 1 or in the processor 11 or the like outside the sensor device 1 can be realized.

The sensor device 1 according to an embodiment has been described to include the array sensor 2 in which a plurality of imaging elements are arranged one-dimensionally or two-dimensionally, some of the imaging elements are configured as color-filter-disposed pixels in which a color filter is disposed in an incident optical path, color information acquisition points 90 are formed by the color-filter-disposed pixels, and the color information acquisition points 90 are discretely disposed.

By discretely disposing the color information acquisition points 90, the number of the color information acquisition points 90 is suppressed as much as possible, and actual color information of each portion inside an image can be acquired. Accordingly, improvement of reproducibility of the coloring processing in the arithmetic operation unit 8 inside the sensor device 1 or in the processor 11 or the like outside the sensor device 1 can be realized.

The technology of the present disclosure is not limited to the configuration example of the embodiment, and various modified examples are assumed. The configuration of the sensor device 1 is not limited to those illustrated in FIGS. 1, 23, and 24.

The array sensor 2 is not limited to pixels receiving visible light and may be a plurality of imaging elements of non-visible light.

The disposition and the configuration of the color information acquisition points 90 are not limited to those illustrated as examples, and furthermore, various example may be considered. The color information acquisition points 90 may be configured using at least some of pixels.

The advantageous effects described in the present specification are merely exemplary and are not limited, and other advantageous effects may be obtained.

Meanwhile, the present technology can also adopt the following configurations.

(1) An image processing method including: performing object detection for an image acquired by imaging using an array sensor in which a plurality of imaging elements are arranged one-dimensionally or two-dimensionally, some of the imaging elements are configured as color-filter-disposed pixels in which a color filter is disposed in an incident optical path, and color information acquisition points are formed by the color-filter-disposed pixels; and performing coloring processing in a pixel range of a detected object by referring to color information acquired at the color information acquisition points corresponding to the inside of the pixel range of the detected object.

(2) The image processing method according to (1) described above, in which, in the coloring processing, coloring of the pixel range of the detected object is performed by setting candidate colors in the detected object using a color estimating process based on learning data and selecting a candidate color on the basis of the color information acquired from the color information acquisition points.

(3) A sensor device including: an array sensor in which a plurality of imaging elements are arranged one-dimensionally or two-dimensionally, some of the imaging elements are configured as color-filter-disposed pixels in which a color filter is disposed in an incident optical path, and color information acquisition points are formed by the color-filter-disposed pixels; and an arithmetic operation unit performing object detection for an image acquired by imaging using the array sensor and performing coloring processing in a pixel range of a detected object by referring to color information acquired at the color information acquisition points corresponding to the inside of the pixel range of the detected object.

(4) The sensor device according to (3) described above, in which the arithmetic operation unit performs coloring processing of the pixel range of the detected object by setting candidate colors in the detected object using a color estimating process based on learning data and selecting a candidate color on the basis of the color information acquired from the color information acquisition points.

(5) The sensor device according to (4) described above, in which, the arithmetic operation unit generates a color layer on the basis of the candidate color selected on the basis of the color information acquired from the color information acquisition points and generates a color image by combining the color layer with a luminance information image acquired from the array sensor.

(6) The sensor device according to (5) described above, in which, the arithmetic operation unit performs luminance correction of pixels corresponding to the color information acquisition points for the luminance information image acquired from the array sensor and combines the luminance information image and the color layer.

(7) The sensor device according to any one of (3) to (6) described above, in which, a total area of pixels not forming the color information acquisition points exceeds 25% of a total area of all the effective pixels on the array sensor.

(8) The sensor device according to any one of (3) to (7) described above, in which the color information acquisition points are discretely disposed in the array sensor.

(9) The sensor device according to any one of (3) to (8) described above, in which the color information acquisition points are disposed at constant intervals in the array sensor.

(10) The sensor device according to any one of (3) to (8) described above, wherein the color information acquisition points are disposed at non-constant intervals in the array sensor.

(11) The sensor device according to any one of (3) to (10) described above, in which one unit of the color information acquisition points is configured using a plurality of adjacent pixels.

(12) The sensor device according to any one of (3) to (11) described above, in which one unit of the color information acquisition points is configured using a plurality of adjacent pixels and includes an R pixel, a G pixel, and a B pixel.

(13) The sensor device according to any one of (3) to (12) described above, in which one unit of the color information acquisition points is configured using a plurality of adjacent pixels and includes an R pixel, a G pixel, a B pixel, and a pixel of another color.

(14) The sensor device according to any one of (3) to (10) described above, in which one unit of the color information acquisition points is configured using one pixel, and the color information acquisition points are discretely disposed in the array sensor.

(15) A sensor device including an array sensor in which a plurality of imaging elements are arranged one-dimensionally or two-dimensionally, some of the imaging elements are configured as color-filter-disposed pixels in which a color filter is disposed in an incident optical path, color information acquisition points are formed by the color-filter-disposed pixels, and a total area of pixels not forming the color information acquisition points exceeds 25% of a total area of all the effective pixels on the array sensor.

(16) A sensor device including an array sensor in which a plurality of imaging elements are arranged one-dimensionally or two-dimensionally, some of the imaging elements are configured as color-filter-disposed pixels in which a color filter is disposed in an incident optical path, color information acquisition points are formed by the color-filter-disposed pixels, and the color information acquisition points are discretely disposed.

REFERENCE SIGNS LIST

1 Sensor device
2 Array sensor
3 ADC/pixel selector
4 Buffer
5 Logic unit
6 Memory
7 Interface unit
8 Arithmetic operation unit
11 Processor
12 External sensor
30 Signal processing unit
81 Key frame selection unit
82 Object region recognition unit
83 Class identification unit
84 Parameter selection unit
85 Color processing unit
90 Color information detection point
100 Terminal device

The invention claimed is:

1. An image processing method comprising:
performing object detection for an image acquired by imaging using an array sensor in which a plurality of imaging elements are arranged one-dimensionally or two-dimensionally, some of the imaging elements are configured as color-filter-disposed pixels in which a color filter is disposed in an incident optical path, and color information acquisition points are formed by the color-filter-disposed pixels; and performing coloring processing in a pixel range of a detected object by referring to color information acquired at the color information acquisition points corresponding to the inside of the pixel range of the detected object, wherein, in the coloring processing, coloring of the pixel range of the detected object is performed by setting candidate colors in the detected object using a color estimating process based on learning data from machine learning and selecting a candidate color on a basis of the color information acquired from the color information acquisition points.

2. A sensor device comprising:

an array sensor in which a plurality of imaging elements are arranged one-dimensionally or two-dimensionally, some of the imaging elements are configured as color-filter-disposed pixels in which a color filter is disposed in an incident optical path, and color information acquisition points are formed by the color-filter-disposed pixels; and arithmetic operation circuitry configured to perform object detection for an image acquired by imaging using the array sensor and performing coloring processing in a pixel range of a detected object by referring to color information acquired at the color information acquisition points corresponding to the inside of the pixel range of the detected object, wherein the arithmetic operation circuitry is configured to perform coloring processing of the pixel range of the detected object by setting candidate colors in the detected object using a color estimating process based on learning data from machine learning and selecting a candidate color on a basis of the color information acquired from the color information acquisition points.

3. The sensor device according to claim 2, wherein the arithmetic operation circuitry is configured to generate a color layer on the basis of the candidate color selected on the basis of the color information acquired from the color information acquisition points and generate a color image by combining the color layer with a luminance information image acquired from the array sensor.

4. The sensor device according to claim 3, wherein the arithmetic operation circuitry is configured to perform luminance correction of pixels corresponding to the color information acquisition points for the luminance information image acquired from the array sensor and combine the luminance information image and the color layer.

5. The sensor device according to claim 2, wherein a total area of pixels not forming the color information acquisition points exceeds 25% of a total area of all the effective pixels on the array sensor.

6. The sensor device according to claim 2, wherein the color information acquisition points are discretely disposed in the array sensor.

7. The sensor device according to claim 2, wherein the color information acquisition points are disposed at constant intervals in the array sensor.

8. The sensor device according to claim 2, wherein the color information acquisition points are disposed at non-constant intervals in the array sensor.

9. The sensor device according to claim 2, wherein one unit of the color information acquisition points is configured using a plurality of adjacent pixels.

10. The sensor device according to claim 2, wherein one unit of the color information acquisition points is configured using a plurality of adjacent pixels and includes an R pixel, a G pixel, and a B pixel.

11. The sensor device according to claim 2, wherein one unit of the color information acquisition points is configured using a plurality of adjacent pixels and includes an R pixel, a G pixel, a B pixel, and a pixel of another color.

12. The sensor device according to claim 2, wherein one unit of the color information acquisition points is configured using one pixel, and the color information acquisition points are discretely disposed in the array sensor.

* * * * *